United States Patent
Sakawaki et al.

(10) Patent No.: US 6,808,830 B2
(45) Date of Patent: Oct. 26, 2004

(54) MAGNETIC RECORDING MEDIUM, PRODUCTION PROCESS AND APPARATUS THEREOF, AND MAGNETIC RECORDING AND REPRODUCING APPARATUS

(75) Inventors: Akira Sakawaki, Ichihara (JP); Hiroshi Sakai, Ichihara (JP)

(73) Assignee: Showa Denko K.K., Tokyo (JP)

(*) Notice: Subject to any disclaimer, the term of this patent is extended or adjusted under 35 U.S.C. 154(b) by 0 days.

(21) Appl. No.: 10/329,686

(22) Filed: Dec. 27, 2002

(65) Prior Publication Data

US 2003/0175556 A1 Sep. 18, 2003

Related U.S. Application Data

(63) Continuation-in-part of application No. 10/029,153, filed on Dec. 28, 2001.
(60) Provisional application No. 60/347,868, filed on Jan. 15, 2002.

(30) Foreign Application Priority Data

Dec. 28, 2001 (JP) ........................................ 2001-401182
Dec. 28, 2001 (JP) ........................................ 2001-401184

(51) Int. Cl.$^7$ .............................. G11B 5/66; G11B 5/70
(52) U.S. Cl. ......................... 428/694 TS; 428/694 TM; 428/900
(58) Field of Search ................... 428/694 TS, 694 TM, 428/900

(56) References Cited

U.S. PATENT DOCUMENTS 4,770,924 A * 9/1988 Takai et al. ................. 428/212
4,900,622 A * 2/1990 Nakayama et al. .......... 428/336
5,453,886 A * 9/1995 Kobayashi et al. ............ 360/46

FOREIGN PATENT DOCUMENTS

| JP | 62-082516 A | 4/1987 |
| JP | 01-220217 A | 9/1989 |
| JP | 05-143988 A | 6/1993 |
| JP | 10-289437 A | 10/1998 |
| JP | 11-283235 A | 10/1999 |
| JP | 11-328646 A | 11/1999 |
| JP | 2000-276726 A | 10/2000 |

* cited by examiner

Primary Examiner—Holly Rickman
(74) Attorney, Agent, or Firm—Sughrue Mion, PLLC

(57) ABSTRACT

The present invention is made to provide a magnetic recording medium, which exhibits excellent magnetic characteristics, such as thermal stability and excellent glide height characteristics, and can be easily produced. The basic constitution is a non-magnetic substrate on which is formed a non-magnetic undercoat layer, a magnetic layer, and a protective layer, wherein the non-magnetic undercoat layer has a bcc structure; an orientation-adjustment layer for causing the non-magnetic undercoat layer to have a predominant orientation plane of (200) is formed between the non-magnetic substrate and the non-magnetic undercoat layer; the magnetic layer has a crystal structure in which columnar fine crystal grains are inclined in the circumferential direction; and the ratio of the coercive force in the circumferential direction of the magnetic layer 4 Hcc to the coercive force in the radial direction Hcr, i.e., Hcc/Hcr, is more than 1.

33 Claims, 12 Drawing Sheets

CIRCUMFERENTIAL DIRECTION

MAGNETIC RECORDING MEDIUM, PRODUCTION PROCESS AND APPARATUS THEREOF, AND MAGNETIC RECORDING AND REPRODUCING APPARATUS

CROSS-REFERENCE TO RELATED APPLICATION

This application claims the benetit pursuant to 35 U.S.C. § 119(e)(1) or U.S. Provisional Applications No. 60/347,868 filed Jan. 15, 2002, and is a Continuation-in-Part of application Ser. No. 10/029,153 filed Dec. 28, 2001; the above noted prior applications are all hereby incorporated by reference.

BACKGROUND OF THE INVENTION

1. Field of the Invention

The present invention relates to a magnetic recording medium used in, for example, peripheral devices of calculators, or magnetic disk apparatuses used for recording of image and sound data, a process and apparatus for producing the magnetic recording medium, and a magnetic recording and reproducing apparatus incorporating the magnetic recording medium.

2. Description of the Related Art

As recording density of magnetic recording media is increased, reduction in noise and enhancement of resolution by means of miniaturization or magnetic isolation of magnetic grains in a magnetic layer, and or reduction of the thickness of the magnetic layer, for example, has been proposed.

However, when the magnetic grains are miniturized or magnetically isolated, or when thickness of the magnetic layer is reduced, the size of the magnetic grains is reduced, and therefore, there is a problem wherein thermal stability is decreased. The term "thermal decay" refers to a phenomenon in which recording bits become unstable and recorded data are lost. In a magnetic recording and reproducing apparatus, this is manifested in the form of reduction in reproduction output of recorded data over the passage of time.

Hitherto, as substrates used for magnetic recording media, non-magnetic metallic substrates comprising aluminum alloys and the like have been frequently used. Usually, a hard film comprising NiP or the like is provided on such a non-magnetic metallic substrate in order to harden its surface, then the surface of the substrate is subjected to texturing, and the substrate is used for producing a magnetic recording medium.

Texturing is a process for forming irregularities on the surface of a substrate along a predetermined direction (usually in a circumferential direction). By carrying out texturing, the crystal orientation of an undercoat layer and a magnetic layer, which are formed on the substrate, is enhanced, the magnetic anisotropy of the magnetic layer is enhanced, and magnetic characteristics, such as thermal stability, can be enhanced.

In recent years, instead of a metallic substrate comprising aluminum or the like, a non-metallic substrate comprising glass, ceramic, or the like has been widely used as a substrate for a magnetic recording medium. In the non-metallic substrate, head slap does not easily occur due to the high hardness, and furthermore, there is an advantage in the point of glide height characteristics because it has high surface smoothness.

In order to solve such problems, formation of a hard film which can be easily textured on a non-metallic substrate comprising glass, ceramics, or the like has been proposed.

For example, Japanese Unexamined Patent Application, First Publication No. Hei 5-197941 discloses a magnetic recording medium including a non-metallic substrate formed by sputtering with an NiP film which is a hard film that can be easily textured.

A magnetic recording medium including a hard film formed on a non-metallic substrate is produced through the following process: the hard film is formed on the substrate in a film formation apparatus such as a sputtering apparatus; thereafter, the substrate is temporarily removed from the film formation apparatus and subjected to texturing by use of a texturing apparatus; the resultant substrate is again placed in the film formation apparatus, and then an undercoat layer and a magnetic layer are formed.

However, in the case of the aforementioned conventional magnetic recording medium which uses a non-magnetic metallic substrate such as an aluminum substrate or a non-metallic substrate such as a glass substrate, when a hard film formed from NiP, which is formed on the surface, is subjected to texturing, the magnetic anisotropy of a magnetic layer can be enhanced but the surface smoothness of the medium tends to be lowered because of surface irregularities of the hard film. Consequently, glide height characteristics are deteriorated, and attainment of high recording density becomes difficult. In addition, the production process for the magnetic recording medium includes complicated production steps, resulting in high production costs.

The present invention was made in view of the foregoing conditions, and an object of the present invention is to provide: a magnetic recording medium which exhibits excellent magnetic characteristics such as thermal stability and excellent glide height characteristics and which is easily produced; a process and apparatus for producing the magnetic recording medium easily; and a magnetic recording and reproducing apparatus which uses the magnetic recording medium exhibiting excellent magnetic characteristics such as thermal stability.

SUMMARY OF THE INVENTION

The magnetic recording medium of the present invention has as a basic structure of a non-magnetic substrate, a non-magnetic undercoat layer, a magnetic layer, and a protective layer, the layers being formed on the substrate, wherein the non-magnetic undercoat layer has a bee structure; an orientation-adjustment layer for causing the non-magnetic undercoat layer to have a predominant plane of (200) is formed between the non-magnetic substrate and the non-magnetic undercoat layer; the magnetic layer has a crystal structure in which columnar fine crystal grains are inclined in the circumferential direction; the ratio of the coercive force in the circumferential direction of the magnetic layer Hcc to the coercive force in the radial direction of the magnetic layer Hcr, i.e., Hcc/Hcr, is more than 1.

The non-magnetic undercoat layer is preferably constituted to have a crystal structure in which columnar fine crystal grains are inclined in the radial direction.

The magnetic layer includes a plurality of magnetic films having an hcp structure and a predominant orientation plane of (110), and a structure in which it is possible to form antiferromagnetic coupling between the magnetic films is preferable.

The orientation-adjustment layer is preferably constituted to have a crystal structure in which columnar fine crystal grains are inclined in the radial direction.

Due to the above constitution, the magnetic anisotropy of the magnetic layer in the circumferential direction can be enhanced and crystal magnetic anisotropy constant (Ku) can be improved. Therefore, it is possible to improve magnetic characteristics such as the coercive force, the S/N ratio of the recording and reproduction signal, and thermal stability.

In addition, in the present invention, due to antiferromagnetic bonding between magnetic films, regarding the magnetization of the magnetic films other than the primary magnetic film which has the highest coercive force, it is possible to achieve a state wherein there is no apparent magnetization, or a state wherein the magnetization of the primary magnetic film is apparently reduced by an amount of magnetization corresponding to the magnetization of the magnetic films other than that of the primary magnetic film.

Therefore, the volume of the magnetic grains can be increased sufficiently without adversely affecting noise and resolution, thermal stabilization can be attained, and thermal stability can be improved.

The magnetic layer may have a laminated ferrimagnetic structure in which the directions of the magnetic moments of adjacent magnetic films are opposite to each other.

The magnetic layer may have a structure including a plurality of magnetic films and an intermediate film provided therebetween.

The magnetic layer may have two or more laminated structures, each including a magnetic film and an intermediate film adjacent thereto.

Preferably, the antiferromagnetic bonding magnetic field of a magnetic film adjacent to the primary magnetic film having the largest coercive force among the plurality of magnetic films is set to be larger than the coercive force of the magnetic film adjacent to the primary magnetic film.

Preferably, the intermediate film is formed from a material predominantly comprising at least one element selected from among Ru, Cr, Ir, Rh, Mo, Cu, Co, Re, and V.

The orientation-adjustment layer may have a constitution which causes the non-magnetic undercoat layer of a bcc structure to have a predominant orientation plane of (200), i.e., a constitution formed of one or more elements selected from among Cr, V, Nb, Mo, W, and Ta.

The orientation-adjustment layer may have a constitution which causes the non-magnetic undercoat layer of a bcc structure to have a predominant orientation plane of (200), i.e., a constitution formed of an alloy predominantly comprising Cr.

The orientation-adjustment layer may have a constitution which causes the non-magnetic undercoat layer of a bcc structure to have a predominant orientation plane of (200), i.e., a constitution predominantly containing a Ta-containing alloy $X_1$Ta (wherein $X_1$ is one or more elements selected from among Be, Co, Cr, Fe, Nb, Ni, V, Zn, and Zr), and may have an Fd3m structure or an amorphous structure.

The orientation-adjustment layer may have a constitution which causes the non-magnetic undercoat layer of a bcc structure to have a predominant orientation plane of (200), i.e., a constitution predominantly containing an Nb-containing alloy $X_2$Nb (wherein $X_2$ is one or more elements selected from among Be, Co, Cr, Fe, Ni, Ta, V, Zn, and Zr), and may have an Fd3m structure or an amorphous structure.

The orientation-adjustment layer may have a constitution which causes the non-magnetic undercoat layer of a bcc structure to have a predominant orientation plane of (200), i.e., a constitution predominantly containing CoTa (Ta content: 30–75 at %) or CoNb (Nb content: 30–75 at %), and may have an Fd3m structure or an amorphous structure.

The orientation-adjustment layer may have a constitution which causes the non-magnetic undercoat layer of a bcc structure to have a predominant orientation plane of (200), i.e., a constitution predominantly containing CrTa (Ta content: 15–75 at %) or CrNb (Nb content: 15–75 at %).

The orientation-adjustment layer may have a constitution which causes the non-magnetic undercoat layer of a bcc structure to have a predominant orientation plane of (200), i.e., a constitution predominantly containing NiTa (Ta content: 30–75 at %) or NiNb (Nb content: 30–75 at %), and may have an Fd3m structure or an amorphous structure.

The orientation-adjustment layer may have a constitution which causes the non-magnetic undercoat layer of a bcc structure to have a predominant orientation plane of (200), i.e., a constitution containing a non-magnetic metal having an Fd3m structure.

The orientation-adjustment layer may have a constitution which causes the non-magnetic undercoat layer of a bcc structure to have a predominant orientation plane of (200), i.e., a constitution containing a non-magnetic metal having a C15 structure.

In the present invention, an orientation-enhancing layer may be formed between the non-magnetic substrate and the orientation-adjustment layer.

The orientation-enhancing layer may comprise a material having a B2 structure or an amorphous structure.

The orientation-enhancing layer may predominantly comprise any one of NiAl, FeAl, CoAl, CoZr, CoCrZr, and CoCrC.

In the present invention, a plurality of orientation-adjustment layers may be provided.

The magnetic recording medium of the present invention adopts a constitution which has a basic structure of a non-magnetic substrate, a magnetic layer, and a protective layer, the layers being formed on the substrate, wherein an orientation-adjustment layer for adjusting the crystal orientation of a layer provided directly thereon is formed between the non-magnetic substrate and the magnetic layer; the magnetic layer has a crystal structure in which columnar fine crystal grains are inclined in the circumferential direction; and the ratio of the coercive force in the circumferential direction of the magnetic layer Hcc to the coercive force in the radial direction of the magnetic layer Hcr, i.e., Hcc/Hcr, is more than 1.

The magnetic layer includes a plurality of magnetic films having an hcp structure and a predominant orientation plane of (110), and a structure in which it is possible to form antiferromagnetic coupling between the magnetic films is preferable.

The orientation-adjustment layer is preferably constituted to have a crystal structure in which columnar fine crystal grains are inclined in the radial direction.

The magnetic recording medium of the present invention assumes a constitution having a basic structure of a non-magnetic substrate, a non-magnetic undercoat layer, a magnetic layer, and a protective layer, the layers being formed on the substrate, wherein an orientation-adjustment layer for adjusting the crystal orientation of a layer provided directly thereon is formed between the non-magnetic substrate and the non-magnetic undercoat layer; the non-magnetic undercoat layer has a bcc structure; the magnetic layer has a crystal structure in which columnar fine crystal grains are inclined in the circumferential direction; the orientation-adjustment layer is formed from an NiP alloy having an amorphous structure, and can cause the non-magnetic undercoat layer to have a predominant orientation plane of (200); and the ratio of the coercive force in the circumferential direction of the magnetic layer Hcc to the coercive force in the radial direction of the magnetic layer, (Hcr), i.e., Hcc/Hcr, is more than 1.

The non-magnetic undercoat layer is preferably constituted to have a crystal structure in which columnar fine crystal grains are inclined in the radial direction.

The magnetic layer includes a plurality of magnetic films having an hcp structure and a predominant orientation plane of (110), and a structure in which it is possible to form antiferromagnetic coupling between the magnetic films is preferable.

The orientation-adjustment layer may comprise nitrogen or oxygen in an amount of at least 1 at %.

The magnetic recording medium production process of the present invention produces a magnetic recording medium which takes as a basic structure a non-magnetic substrate, a non-magnetic undercoat layer, a magnetic layer, and a protective layer, the layers being formed on the substrate, wherein the non-magnetic undercoat layer has a bcc structure, and an orientation-adjustment layer for causing the non-magnetic undercoat layer to have a predominant orientation plane of (200) is formed between the non-magnetic substrate and the non-magnetic undercoat layer; and is characterized in that the magnetic layer is formed by releasing film formation particles from a release source and depositing them on a deposition surface, and at this time, the direction of the film formation particles is set so that the projection line of the film formation particle trajectory to a surface perpendicular to the radial direction of the film formation particle deposition point is inclined with respect to the non-magnetic substrate.

In the production method of the present invention, the magnetic layer includes a plurality of magnetic films having an hcp structure and a predominant orientation plane of (110), and a structure in which it is possible to form antiferromagnetic coupling between the magnetic films is preferable.

In the production process of the present invention, it is possible to form at least one of the non-magnetic undercoat layer and the orientation-adjustment layer, and at that time, to set the film formation particles such that a projection line to the deposition surface of the trajectory of the film formation particles lies substantially along the radial direction of the non-magnetic substrate and impinges at an angle with respect to the non-magnetic substrate.

In the production process of the present invention, it is possible to carry out oxidation or nitrification on the orientation-adjustment layer.

The orientation-adjustment layer may be formed through sputtering by use of a sputtering target serving as a release source of film formation particles.

When the orientation-adjustment layer is formed, an oxidation process or nitrification process by use of a sputtering gas containing oxygen or nitrogen may be carried out.

The oxidation process or nitrification process may be carried out by bringing the surface of the orientation-adjustment layer into contact with an oxygen-containing gas or a nitrogen-containing gas.

The production apparatus for producing a magnetic recording medium of the present invention is an apparatus for producing a magnetic recording medium having a basic structure of a non-magnetic substrate, a non-magnetic undercoat layer, a magnetic layer, and a protective layer, the layers being formed on the substrate, wherein the non-magnetic undercoat layer has a bcc structure, and an orientation-adjustment layer for causing the non-magnetic undercoat layer to have a predominant orientation plane of (200) is formed between the non-magnetic substrate and the non-magnetic undercoat layer; the apparatus comprises a release source for forming a magnetic layer by releasing film formation particles and depositing the particles onto a deposition surface, and a direction-setting means for setting the direction of the film formation particles released from the release source, and is characterized in that the direction-setting means can set the direction of the particles such that a projection line of the trajectory of the formation particles to a surface which is perpendicular to the radial direction of the film formation particle deposition point is at an angle with respect to the non-magnetic substrate.

The magnetic recording and reproducing apparatus of the present invention provides a magnetic recording medium, and a magnetic head for recording information onto the magnetic recording medium and reproducing the data therefrom, and is characterized in that the magnetic recording medium has a basic structure of a non-magnetic substrate, a non-magnetic undercoat layer, a magnetic layer, and a protective layer, the layers being formed on the substrate, wherein the non-magnetic undercoat layer has a bcc structure; an orientation-adjustment layer for causing the non-magnetic undercoat layer to have a predominant orientation plane of (200) is formed between the non-magnetic substrate and the non-magnetic undercoat layer; the magnetic layer has a crystal structure in which columnar fine crystal grains are inclined in the circumferential direction; and the ratio of the coercive force in the circumferential direction of the magnetic layer Hcc to the coercive force in the radial direction of the magnetic layer Hcr; i.e., Hcc/Hcr, is more than 1.

The non-magnetic undercoat layer is preferably constituted to have a crystal structure in which columnar fine crystal grains are inclined in the radial direction.

The magnetic layer includes a plurality of magnetic films having an hcp structure and a predominant orientation plane of (110), and a structure in which it is possible to form antiferromagnetic coupling between the magnetic films is preferable.

The orientation-adjustment layer is preferably constituted to have a crystal structure in which columnar fine crystal grains are inclined in the radial direction.

DETAILED DESCRIPTION OF THE INVENTION

Figure 1A:
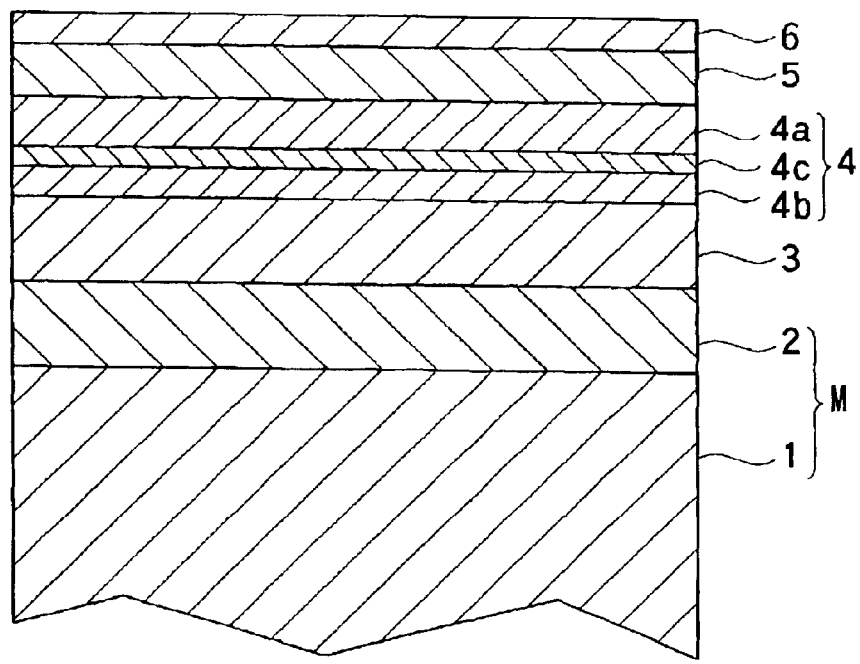
FIG. 1A is a partial cross-sectional view showing a first embodiment of the magnetic recording medium of the present invention.

FIG. 1 shows a first embodiment of the magnetic recording medium of the present invention. The magnetic recording medium shown in FIG. 1 includes an orientation-adjustment determining layer 2 which is formed on a non-magnetic substrate 1, and a non-magnetic undercoat layer 3, a magnetic layer 4, a protective layer 5, and a lubrication layer 6 are successively formed thereon.

Figure 1B:
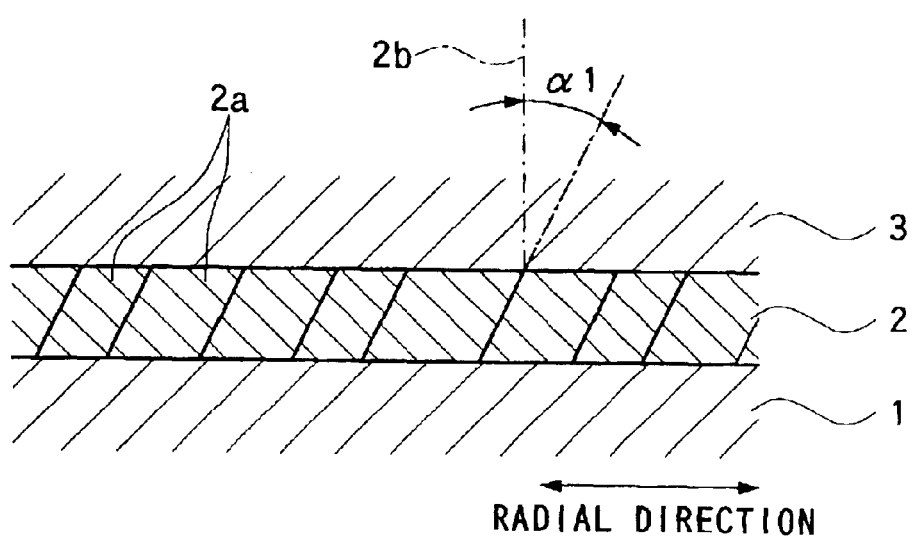
FIG. 1B is an enlarged view showing the essential portions and is prepared from a transmission electron microscope (TEM) photograph of the cross section of the magnetic recording medium shown in FIG. 1A.

FIG. 1A is a cross-sectional view showing the entire structure of the magnetic recording medium of the present embodiment, and FIG. 1B is an enlarged view showing an essential portion of the magnetic recording medium, derived from a transmission electron microscope (TEM) photograph of a cross section of the magnetic recording medium.

The non-magnetic substrate 1 may be a metallic substrate formed from a metallic material such as aluminum or an aluminum alloy, or a non-metallic substrate formed from a non-metallic material such as glass, ceramic, silicon, silicon carbide, or carbon.

Amorphous glass or crystallized glass may be used as the glass substrate. General-purpose soda-lime glass, aluminocate glass, or aluminosilicate glass can be used as the amorphous glass. Lithium-based crystallized glass may be used as the crystallized glass.

A general-purpose sintered compact predominantly containing aluminum oxide, aluminum nitride, silicon nitride, or the like, or a fiber-reinforced material thereof can be used as the ceramic substrate.

From the viewpoints of durability and cost, the non-magnetic substrate 1 is preferably a glass substrate.

Substrates on which an NiP layer is formed by plating or the like of the surface of the substrate can be given as examples of the non-magnetic substrate 1

In the present invention, a non-magnetic metallic substrate formed from aluminum or the like, and a non-metallic substrate such as a glass substrate will be called a "non-magnetic substrate".

A texturing process may be carried out on the surface of the non-magnetic substrate 1. A suitable average roughness, Ra, of the surface of the substrate 1 is 0.01 to 2 nm (preferably 0.05 to 1.5 nm).

The orientation-adjustment layer 2 is provided for adjusting the crystal orientation of the non-magnetic undercoat layer 3 formed directly on the layer 2 and for adjusting the crystal orientation of the magnetic layer 4 formed on the layer 3, to thereby improve the magnetic anisotropy of the magnetic layer 4.

The orientation-adjustment layer 2 is preferably formed from one or more elements selected from among Cr, V, Nb, Mo, W, and Ta. As a result, the non-magnetic undercoat layer 3 of a bcc structure can have a predominant orientation plane of (200).

As the material of the orientation-adjustment layer 2, an alloy predominantly containing Cr (i.e., the Cr content of the alloy is in excess of 50 at %) can be used. Particularly, a $CrX_0$-based alloy (wherein $X_0$ is one or more elements selected from among V, Nb, Mo, Ta, and W) is preferably used. As a result, the non-magnetic undercoat layer 3 of a bcc structure can have a predominant orientation plane of (200).

When a $CrX_o$-based alloy is used, the $X_o$ content of the alloy is preferably at least 1 at % and less than 50 at %. When the $X_o$ content is set to within the above range, the crystal orientation of the non-magnetic undercoat layer 3 and the magnetic layer 4 can be enhanced, to thereby improve the magnetic anisotropy.

The orientation-adjustment layer 2 may have a Ta-containing alloy $X_1Ta$ (wherein $X_1$ is one or more elements selected from among Be, Co, Cr, Fe, Nb, Ni, V, Zn, and Zr) as the main component, and may have an Fd3m structure or an amorphous structure. As a result, the non-magnetic undercoat layer 3 of a bcc structure can have a predominant orientation plane of (200).

The orientation-adjustment layer 2 may predominantly contain an Nb-containing alloy $X_2Nb$ (wherein $X_2$ is one or more elements selected from among Be, Co, Cr, Fe, Ni, Ta, V, Zn, and Zr) as the main component, and may have an Fd3m structure or an amorphous structure. As a result, the non-magnetic undercoat layer 3 of a bcc structure can have a predominant orientation plane of (200).

The orientation-adjustment layer 2 may predominantly contain CoTa or CoNb (Ta or Nb content: 30–75 at %) as the main component, and may have an Fd3m structure or an amorphous structure. As a result, the non-magnetic undercoat layer 3 of a bcc structure can have a predominant orientation plane of (200).

The orientation-adjustment layer 2 may predominantly contain-CrTa or CrNb (Ta or Nb content: 15–75 at %) as the main component. As a result, the non-magnetic undercoat layer 3 of a bcc structure can have a predominant orientation plane of (200).

The orientation-adjustment layer 2 may have predominantly contain Ta or NiNb (Ta or Nb content: 30–75 at %) as the main component, and may have an Fd3m structure or an amorphous structure. As a result, the non-magnetic undercoat layer 3 of a bcc structure can have a predominant orientation plane of (200).

When the orientation-adjustment layer 2 has CoTa, CoNb, CrTa, CrNb, NiTa, or NiNb as the main component, the Ta content or Nb content of the alloy is preferably set within the above range. This is because, when the content is excessively low, the coercive force tends to decrease, whereas when the content is excessively high, there is a risk that the orientation within the magnetic layer will deteriorate and the coercive force may decrease.

The orientation-adjustment layer 2 may also be formed from a non-magnetic alloy material containing Ta or Nb in an amount of 30 at % or more. As a result, the non-magnetic undercoat layer 3 of a bcc structure can have a predominant orientation plane of (200).

The orientation-adjustment layer 2 may be formed from a non-magnetic metal having an Fd3m structure (space group notation). As a result, the non-magnetic undercoat layer 3 of a bcc structure can have a predominant orientation plane of (200).

Preferred examples of the non-magnetic metal having an Fd3m structure include alloys having a C15 structure (Skrukturbercht symbol notation), such as CrNb-based alloys (e.g., 70Cr30Nb), CrTa-based alloys (e.g., 65Cr35Ta), and CrTi-based alloys (e.g., 64Cr36Ti), from among the above-mentioned $CrX_o$-based alloys.

Examples of the metal having an Fd3m structure include alloys having a C15 structure, such as CoTa-based alloys (e.g., 65Co35Ta), CoNb-based alloys (e.g., 70Co30Nb), WHf-based alloys (e.g., 66W34Hf), and AlY-based alloys (e.g., 67Al33Y).

Alloys such as CoTa-based alloys (those having a relatively small Co content, e.g., 50Co50Ta), and FeNb-based alloys (e.g., 50Fe50Nb) can also be used.

When using these materials having an Fd3m structure, it is preferable to adjust the crystalline structure thereof (Fd3m structure) by carrying out oxidation or nitrification (described below) during film formation.

The orientation-adjusting layer 2 serves not only as a layer for adjusting the crystal orientation of the non-magnetic undercoat layer 3, but also serves as a crystal grain miniaturization layer for miniaturizing crystal grains in the non-magnetic undercoat layer 3 and the magnetic layer 4.

The orientation-adjustment layer 2 preferably contains nitrogen or oxygen in an amount of at least 1 at %.

This is because, when nitrogen or oxygen is contained in an amount of at least 1 at %, the crystals of the non-magnetic undercoat layer 3 can be directed in a (200) plane more accurately to thereby enhance the magnetic anisotropy of the magnetic layer 4.

As shown in FIG. 1B, the orientation-adjustment layer 2 preferably has a crystal structure in which columnar fine crystal grains 2a are inclined in the radial direction with respect to a line 2b perpendicular to the non-magnetic substrate 1. The inclination angle al of the crystal grains 2a (i.e., inclination of the axial direction of the crystal grains 2a with respect to the perpendicular line 2b) is preferably more than 0° and less than 90°.

It is preferred that the inclination angle α1 of the columnar fine crystal grains 2a be 10–75° (preferably 15–75°, more preferably 20–75°, and still more preferably 25–55°).

When the inclination angle α1 falls below the above range, the crystal orientation of the non-magnetic undercoat layer 3 and the magnetic layer 4 is impaired, and thus the magnetic anisotropy is lowered. In consideration of the structure of a film formation apparatus, setting the angle α1 in a range which exceeds the above range is difficult.

The inclination angle α1 may be set to a value of at least 10° and less than 30°. The angle α1 may also be set to a value of more than 65° and less than 90°.

The orientation-adjustment layer 2 may have a structure in which the inclination angle of the columnar fine crystal grains 2a is gradually increased from the inner peripheral portion to the outer peripheral portion thereof.

When the orientation-adjustment layer 2 has a structure in which the columnar fine crystal grains 2a are inclined in the radial direction, the inclination in the circumferential direction of the columnar fine crystal grains 2a may be set arbitrarily. However, it is particularly preferable if a structure is assumed in which the columnar fine crystal grains 2a are substantially not inclined in the circumferential direction.

The thickness of the orientation-adjustment layer 2 is preferably 2–100 nm. When the thickness falls below the above range, the magnetic anisotropy of the magnetic layer is lowered, whereas when the thickness exceeds the above range, productivity is lowered.

The average surface roughness, Ra, of the orientation-adjustment layer 2 is preferably 0.4 nm or less, more preferably 0.2 nm or less.

When the average surface roughness, Ra, exceeds the above range, surface irregularities of the medium increase, resulting in deterioration of glide height characteristics.

The non-magnetic undercoat layer 3 may be formed from conventionally known undercoat layer materials, for example, an alloy of one or more elements of Cr, V, and Ta, or other elements, within a range in which the crystallinity is not impaired.

Particularly, Cr or a Cr alloy (e.g., a CrW-based, CrMo-based, or CrV-based alloy) is preferably used.

A material having a B2 structure, such as Ni50Al (Ni-50 at % Al) can be used as the material.

The non-magnetic undercoat layer 3 may have a single-layer structure, or a multi-layer structure in which two or more kinds of films are laminated.

The thickness of the non-magnetic undercoat layer 3 is preferably 1–100 nm, and more preferably 2–50 nm.

The non-magnetic undercoat layer 3 has a bcc structure, and the orientation plane (the predominant crystal plane in the surface of the non-magnetic undercoat layer 3) is (200). Therefore, the magnetic anisotropy of the magnetic layer 4 can be enhanced.

The non-magnetic undercoat layer 3 can be constituted to have a crystal structure in which columnar fine crystal grains are inclined in the radial direction.

Figure 2:
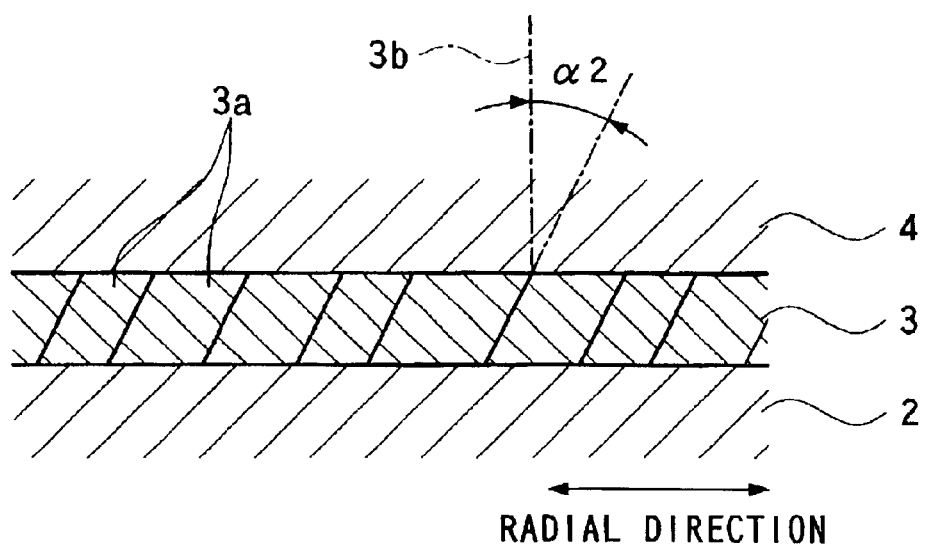
FIG. 2. is an enlarged view of the essential portions and is prepared from a transmission electron microscope (TEM) photograph of the cross section of the magnetic recording medium shown in FIG. 1.

FIG. 2 shows the non-magnetic undercoat layer 3 having a structure in which the columnar fine crystal grains are inclined. The non-magnetic undercoat later 3 shown here has a crystal structure in which the columnar fine crystal grains 3a are inclined in the radial direction with respect to the line 3b perpendicular to the non-magnetic substrate 1. In other words, an inclination angle α2 of the columnar fine crystal grains 3a (inclination in the axial direction of the columnar fine crystal grains 3a with respect to the perpendicular line 3b) exceeds 0° and is less than 90°.

It is preferable if the inclination angle α2 of the columnar fine crystal grains 3a is 10 to 75° (preferably 15 to 75°, more preferably 20 to 75°, and still more preferably 25 to 55°).

When the inclination angle α2 is less than the above range, the crystal orientation of the magnetic layer 4 deteriorates, and the magnetic anisotropy is lowered. From the standpoint of the structure of a film formation apparatus, setting the angle α2 to a range which exceeds the above range is difficult.

The inclination angle α2 can be set to a value of at least 10° and less than 30°. It is possible to set the angle to a value which exceeds 65° and is less than 90°.

When the non-magnetic undercoat layer 3 has a structure in which the columnar fine crystal grains 3a are inclined in the radial direction, the inclination of the circumferential direction of the columnar fine crystal grains 3a can be arbitrarily set. However, it is particularly preferable if a structure is assumed in which the columnar fine crystal grains 3a are not substantially inclined in the circumferential direction.

As shown below, the magnetic layer 4 preferably has a structure in which antiferromagnetic coupling are formed between a plurality of magnetic films, a so-called AFC (Anti Ferromagnetic Coupling) structure.

The magnetic layer 4 includes a first magnetic film 4a (upper layer), a second magnetic film 4b (lower layer), and an intermediate film 4c provided between these films 4a and 4b.

A Co alloy, in which one or more elements selected from among Cr, Pt, Ta, B, Ti, Ag, Cu, Al, Au, W, Nb, Zr, V, Ni, Fe, and Mo is added to Co, for example, can be used in the first and second magnetic films 4a and 4b.

As preferred specific examples of the above material, alloys such as CoPt-based alloys, CoCrPt-based alloys, CoCrPtTa-based alloys, CoCrPtB-based alloys, CoCrPtBTa-based alloys, CoCrPtTaCu-based alloys, CoCrPtTaZr-based alloys, CoCrPtTaW-based alloys, CoCrPtCu-based alloys, CoCrPtZr-based alloys, CoCrPtBCu-based alloys, CoCrPtBZr-based alloys, CoNiTa-based alloys, CoNiTaCr-based alloys, and CoCrTa-based alloys can be used.

A granular film in which magnetic grains are dispersed in a non-magnetic matrix such as a non-magnetic metal (e.g., Ag, Ti, Ru, or C), a compound of the non-magnetic metal, an oxide (e.g., $SiO_2$, SiO, or $Al_2O_3$), a nitride (e.g., $Si_3N_4$, AlN, TiN, or BN), a fluoride (e.g., CaF), or a carbide (e.g., TiC) can also be adopted.

No particular limitation is imposed on the thickness of the first and second magnetic films 4a and 4b. However, when the thickness is very small, the volume of the magnetic grains decreases which is disadvantageous in terms of thermal stability, whereas when the thickness is very large, there is a risk that magnetization of the magnetic layer will becomes excessive resulting in an increase in noise.

Therefore, it is preferable if the thickness of the magnetic film 4a is 1–40 nm (preferably 5–30 nm, and the thickness of the magnetic film 4b is 1–20 nm (preferably 1–10 nm).

It is preferable if the coercive force of the first magnetic film 4a is 2,000 (Oe) or more (preferably 3,000 (Oe) or more). When the coercive force falls below the above range, thermal stability of the magnetic film 4a is lowered, resulting in lowering of the effect of enhancing thermal stability.

The coercive force of the first magnetic film 4a is preferably set so as to be larger than the coercive force of the second magnetic film 4b. In this case, the first magnetic film 4a serves as a primary magnetic film having a coercive force which is larger than that of the second magnetic film 4b. In this case, it is preferable if the coercive force of the entirety of the magnetic layer 4 (magnetic recording medium) becomes equal to the coercive force of the primary magnetic film.

The directions of the magnetic moments of the first and second magnetic films 4a and 4b are opposite each other due to antiferromagnetic bonding via the intermediate film 4c, and thus the magnetic layer 4 has a laminated ferrimagnetic structure.

The first and second magnetic films 4a and 4b have an hcp structure, and the orientation plane of each film is a (110) plane.

It is preferable if a material predominantly containing at least one element selected from among Ru, Cr, Ir, Rh, Mo, Cu, Co, Re, and V is used in the intermediate film 4c. Particularly, Ru is preferably used.

When Ru is used in the intermediate film 4c, it is preferable if the thickness of the intermediate film 4c is set to 0.6–1 nm (preferably 0.7–0.9 nm).

When the thickness falls below or exceeds the above range, antiferromagnetic bonding between the two magnetic films 4a and 4b becomes insufficient with the result that the effect of enhancing thermal stability is lowered.

When Cr or a Cr alloy is used in the intermediate film 4c, it is preferable if the thickness of the film 4c is 2–3 nm (preferably 2.2–2.8 nm). When the thickness falls below or exceeds the above range, antiferromagnetic bonding between the two magnetic films 4a and 4b becomes insufficient with the result that the effect of enhancing thermal stability is lowered.

Figure 3:
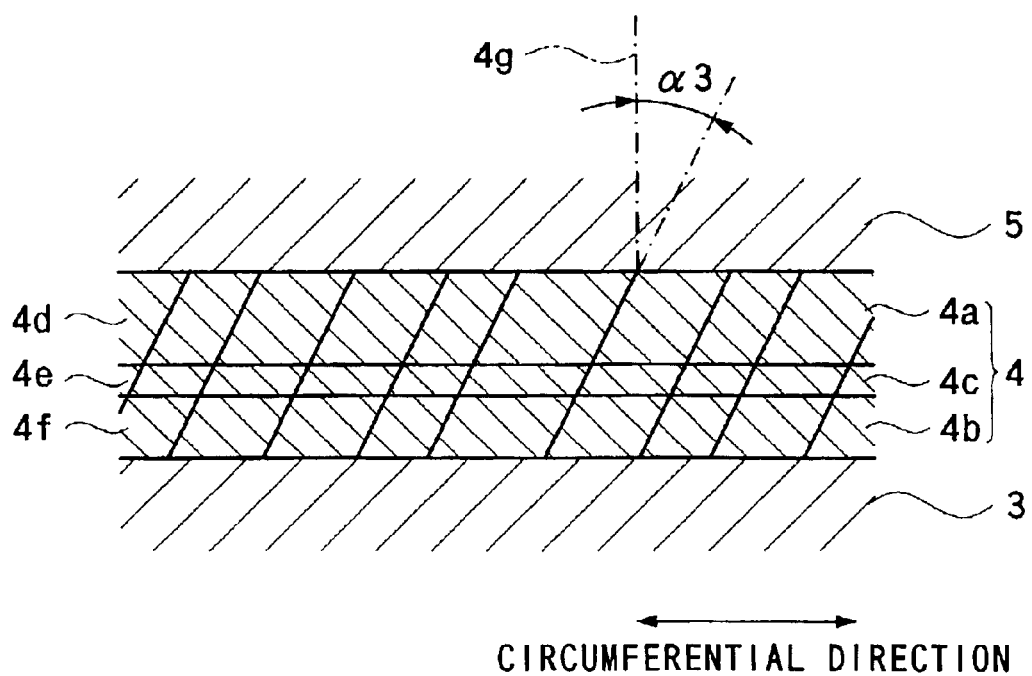
FIG. 3 is an enlarged view of the essential portions and is prepared from a transmission electron microscope (TEM) photograph of the cross section of the magnetic recording medium shown in FIG. 1.

As shown in FIG. 3, the magnetic layer 4 (first magnetic film 4a, intermediate film 4c, and second magnetic film 4b) has a crystal structure in which columnar fine crystal grains 4d, 4e, and 4f are inclined in the circumferential direction of the non-magnetic substrate 1 with respect to a line 4g perpendicular to the substrate 1. In other words, an inclination angle α3 of the columnar fine crystal grains 4d, 4e, and 4f (inclination in the axial direction of the columnar fine crystal grains 4d, 4e, and 4f with respect to the perpendicular line 4g) exceeds 0° and is less than 90°.

It is preferable if the inclination angle α3 of the columnar fine crystal grains 4d, 4e, and 4f is 10 to 75° (preferably 15 to 75°, more preferably 20 to 75°, and still preferably 25 to 55°).

When the inclination angle α3 is less than the above range, the crystal orientation of the magnetic layer 4 deteriorates, and the magnetic anisotropy decreases. From the standpoint of the structure of a film formation apparatus, setting the angle α3 to a range which exceeds the above range is difficult.

The inclination angle α3 can be set to a value of at least 10° and less than 30°. It is also possible to set the angle to a value which exceeds 65° and is less than 90°.

The columnar fine crystal grains 4d, 4e, and 4f may be inclined in the circumferential direction, and the inclination in the radial direction may be arbitrarily set. In other words, the direction of the columnar fine crystal grains when viewed from a plane (the direction of a projection line to the substrate) may be along the tangent line, or it may be along a direction perpendicular to the tangent line.

A conventionally known material may be used as the material of the protective layer 5, for example, a material containing a single component such as carbon, silicon oxide, silicon nitride, or zirconium oxide, or a material predominantly containing such components can be used.

The thickness of the protective layer 5 is preferably 2–10 nm.

The lubrication layer 6 may be formed from a fluorine-based lubricant such as perfluoropolyether.

In the magnetic recording medium having the aforementioned structure, the ratio of the coercive force in the circumferential direction of the magnetic layer 4 Hcc to the coercive force in the radial direction of the layer 4 Hcr, i.e., Hcc/Hcr, is more than 1 (preferably 1.1 or more, and more preferably 1.2 or more).

When the ratio Hcc/Hcr falls below the above range, the magnetic anisotropy of the magnetic recording medium is insufficient, and thus the magnetic characteristics, such as error rate, noise characteristics, and thermal stability are insufficient.

An embodiment of the production process for a magnetic recording medium of the present invention will next be described by taking, as an example, the production of the aforementioned magnetic recording medium.

Figure 4:
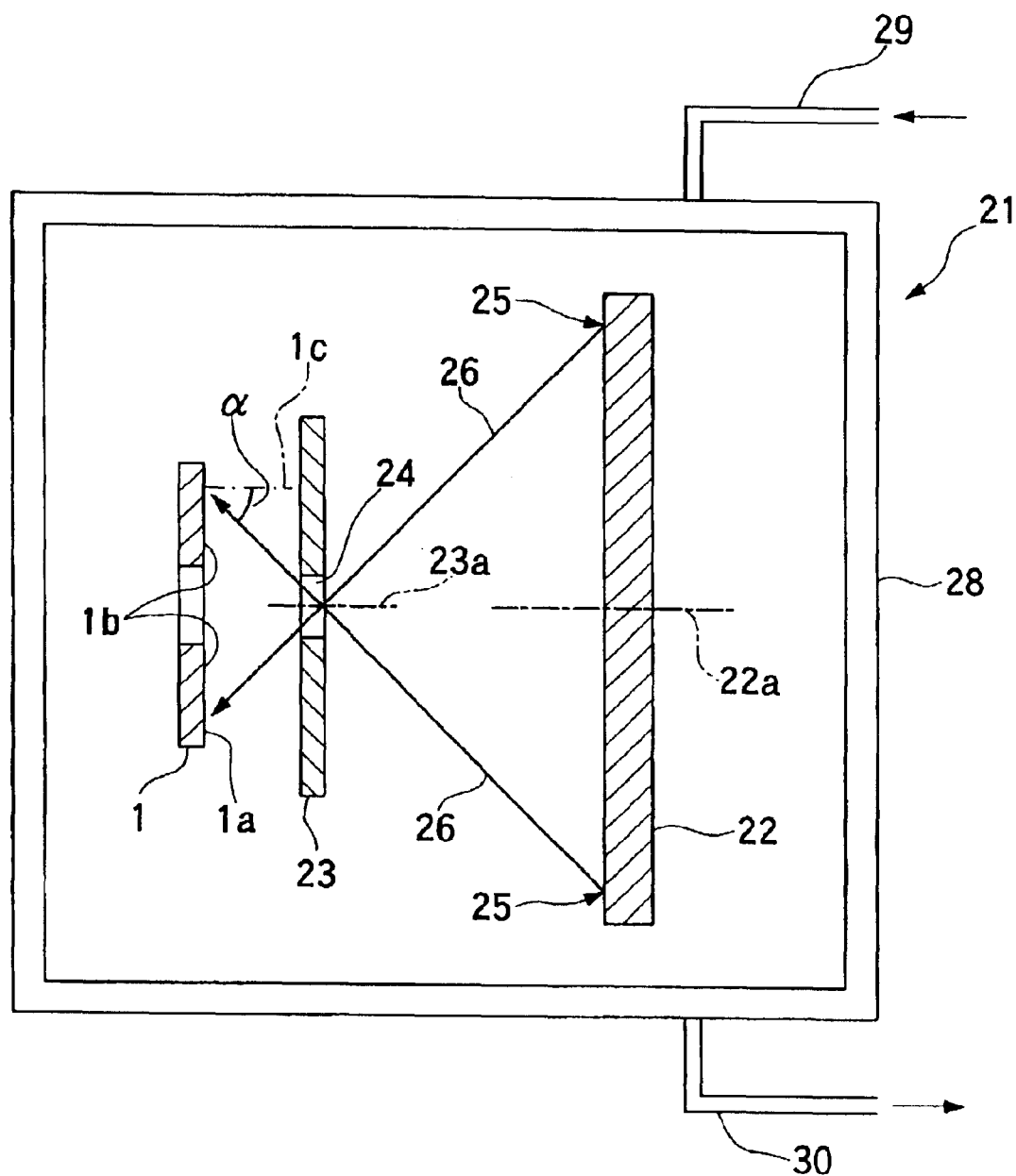
FIG. 4 is a schematic drawing showing an embodiment of the production apparatus for the magnetic recording medium of the present invention.

FIG. 4 shows an embodiment of the production apparatus for the magnetic recording medium of the present invention.

A sputtering apparatus 21 shown in FIG. 4 is employed for forming the orientation-adjustment layer 2 on the non-magnetic substrate 1. The apparatus 21 includes a chamber 28 which is provided with a sputtering target 22 serving as a release source for releasing film formation particles, and a shielding plate 23 serving as a direction-setting means for setting the direction of the film formation particles released from the sputtering target 22.

Reference numeral 29 represents a feed line for feeding a sputtering gas or the like into the chamber 28. Reference numeral 30 represents a discharge line for discharging a sputtering gas or the like from the chamber 28.

The sputtering target 22 comprises a material of a layer which is to be formed, and is formed into a disk shape.

The shielding plate 23 is provided for setting the direction of the film formation particles by shielding particles from among those released from the sputtering target 22 which are released in unintended directions. The shielding plate 23 is formed into a disk shape, and a circular film formation particle through-hole 24 is formed at approximately the center portion.

The shielding plate 23 is provided substantially parallel to the sputtering target 22 and at a predetermined interval with respect to the sputtering target 22.

The shielding plate 23 is provided such that the axis 23a thereof substantially coincides with the axis 22a of the sputtering target 22.

In order to increase the accuracy of the incident angle of the film formation particles, the shielding plate 23 is preferably formed to be as thin as possible. For example, when using a non-magnetic substrate 1 which has an outer diameter of 2.5 inches (63.5 mm), it is preferable if the thickness of the shielding plate 23 is 1.5–5 mm (preferably 2–4 mm).

A metallic material exhibiting excellent heat resistance and producing few impurities (such as stainless steel or an aluminum alloy) is preferably used in the shielding plate 23. Particularly, the use of an aluminum alloy is preferred since film formation particles deposited onto the plate are easily removed, and the alloy is inexpensive.

It is preferable if the inner diameter of the film formation particle through-hole 24 is set such that the incident angle a of the film formation particles is 10–75° with respect to the non-magnetic substrate 1 when the film formation particles which have been released are deposited onto an orientation-adjustment layer formation region 1b of the surface 1a of the substrate 1.

The incident angle α is an angle with respect to a line 1c perpendicular to the non-magnetic substrate 1.

The inner diameter of the film formation particle through hole 24 is preferably reduced to a range in which film formation efficiency is not lowered. For example, when a 2.5-inch (63.5 mm) outer diameter non-magnetic substrate 1 is used, it is preferable if the inner diameter of the film formation particle through hole 24 is 20 mm or less (preferably 15 mm or less, and more preferably 7 mm or less).

When the orientation-adjustment layer 2 is formed by use of the sputtering apparatus 21, the non-magnetic substrate 1 is fed into the chamber 28, and the non-magnetic substrate 1 is disposed on the opposite side of the shielding plate 23 with respect to the sputtering target 22 (left side in the figure). In this case, the non-magnetic substrate 1 is disposed so as to be substantially parallel to the sputtering target 22 and the shielding plate 23.

Subsequently, while a sputtering gas such as argon is fed into the chamber 28 through the feed line 29, electricity is supplied to the sputtering target 22, to thereby release film formation particles from the target by means of sputtering.

Among the film formation particles released from film formation particle release portions 25, 25 located at a distance from the center portion of the sputtering target 22, the particles which are directed toward the center portion of the shielding plate 23 pass through the film formation particle through hole 24, and the rest of the particles are shielded by the shielding plate 23.

Figure 5:
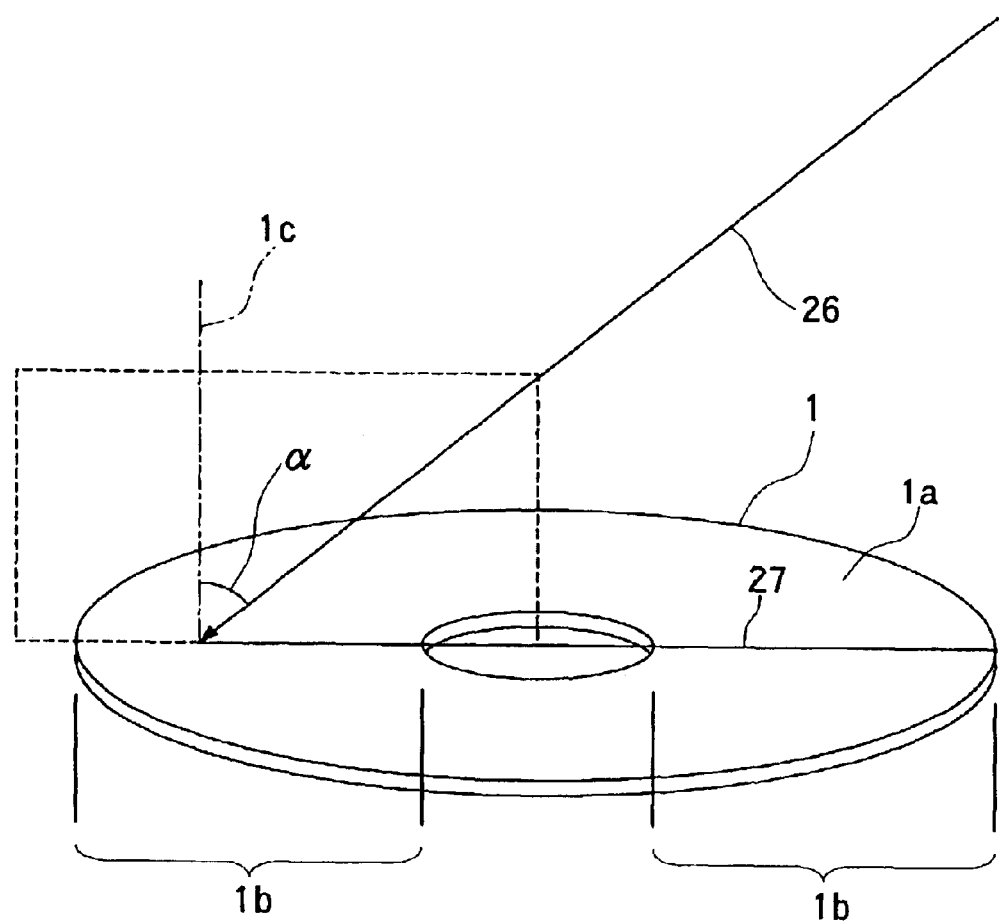
FIG. 5 is an explanatory view showing a method for producing the magnetic recording medium used in the production apparatus shown in FIG. 4.

As shown in FIGS. 4 and 5, the film formation particles which have passed through the film formnation particle through hole 24 are released from the film formation particle release portions 25 located at a distance from the center portion of the target 22 and pass through the film formation particle through hole 24 provided at the center portion of the shielding plate 23 (see FIG. 4). Therefore, a projection line 27 toward the substrate surface 1a of the film formation particle trajectory 26 lies substantially along the radial direction of the non-magnetic substrate 1 (see FIG. 5). Therefore, the film formation particles are uniformly deposited onto the surface 1a in the circumferential direction of the substrate 1.

It is preferable if the film formation particles are deposited onto the circular orientation-adjustment layer formation region 1b of the surface 1a which is the deposition surface such that the incident angle α of the particles is 10–75°.

It is preferable if the incident angle α is 15–75° (preferably 20–75°, and more preferably 25–55°).

When the incident angle α falls below the above range, the crystal orientation of the non-magnetic undercoat layer 3 and the magnetic layer 4 is impaired, and the magnetic anisotropy is lowered. In consideration of the structure of the apparatus, setting the incident angle α to a range exceeding the above range is difficult.

The incident angle α can be set to a value of at least 10° and less than 30°. Alternatively, the angle α can be set to a value which exceeds 65° and is 75° or less.

When the incident angle α is set so as to fall within the above range, as shown in FIG. 1B, the orientation-adjustment layer 2 has a crystal structure in which the columnar fine crystal grains 2a are inclined in the radial direction with respect to the line 2b perpendicular to the non-magnetic substrate 1.

The orientation-adjustment layer 2 is preferably subjected to an oxidation process or a nitrification process.

In order to carry out the oxidation process or nitrification process, when the orientation-adjustment layer 2 is formed by use of the sputtering apparatus 21, a method is adopted which uses an oxygen- or nitrogen-containing gas as the sputtering gas to be fed into the chamber 28 through the feed line 29.

A gas mixture of oxygen and argon can be used as the oxygen-containing sputtering gas. A gas mixture of nitrogen and argon can be used as the nitrogen-containing sputtering gas.

The oxygen content or nitrogen content of the gas mixture is preferably 1–50 vol %.

In the present invention, the oxidation or nitrification process can be carried out by bringing the surface of the orientation-adjustment layer 2 into contact with an oxygen-containing gas or nitrogen-containing gas, after the formation of the orientation-adjustment layer 2.

Air, pure oxygen, or steam can be used as the oxygen-containing gas. Alternatively, an oxygen-rich gas consisting of air in which the oxygen content is increased can be used.

Air, pure nitrogen, or a nitrogen-rich gas can be used as the nitrogen-containing gas.

As a specific example of a method which brings the surface of the orientation-adjustment layer 2 into contact with the oxygen-containing gas or nitrogen-containing gas, as described above, after the orientation-adjustment layer 2 is formed on the substrate 1 in the sputtering apparatus 21, the oxygen-containing gas or nitrogen-containing gas is fed into the chamber 28 through the feed line 29.

The oxygen or nitrogen content of the oxygen-containing gas or nitrogen-containing gas may be 1–100 vol %.

When the amount of oxygen or nitrogen fed into the chamber, or the time of exposure to oxygen or nitrogen is appropriately set, the extent of oxidation (nitrification) of the orientation-adjustment determining layer 2 can be regulated. For example, when the orientation-adjustment layer 2 is exposed to an environment of pressurized oxygen gas of $10^{-3}$ Pa or more under a vacuum of $10^{-4}$ to $10^{-6}$ Pa for 0.1–30 seconds, a predetermined oxidized state is achieved.

By the use of an oxygen-containing gas or nitrogen-containing gas, the oxidation process or nitrification process can be carried out with a simple operation.

By means of the oxidation process or nitrification process, at least the area in proximity to the surface of the orientation-adjustment layer 2 is oxidized or nitrified.

When carrying out the oxidation process or nitrification process, a method can be adopted in which, after forming the orientation-adjustment layer 2 by the use of an oxygen- or nitrogen-containing gas as the sputtering gas, the surface of the orientation-adjustment layer 2 is brought into contact with an oxygen-containing gas or a nitrogen-containing gas. Alternatively, a method can be adopted in which the surface of the orientation-adjustment layer 2 is exposed to air.

The non-magnetic undercoat layer 3 may be formed by using the sputtering apparatus 21 for the case of a crystal structure in which the columnar fine crystal grains are inclined in the radial direction.

In other words, similar to the case of forming the orientation-adjustment layer 2, it is possible to form the non-magnetic undercoat layer by releasing film formation particles from the sputtering target 22 and depositing them on the deposition surface, and by setting the direction of the film formation particles such that the projection line 27 to the deposition surface of the film formation particle trajectory 26 extends in substantially the radial direction of the substrate 1 and is inclined with respect to the substrate 1.

Figure 6:
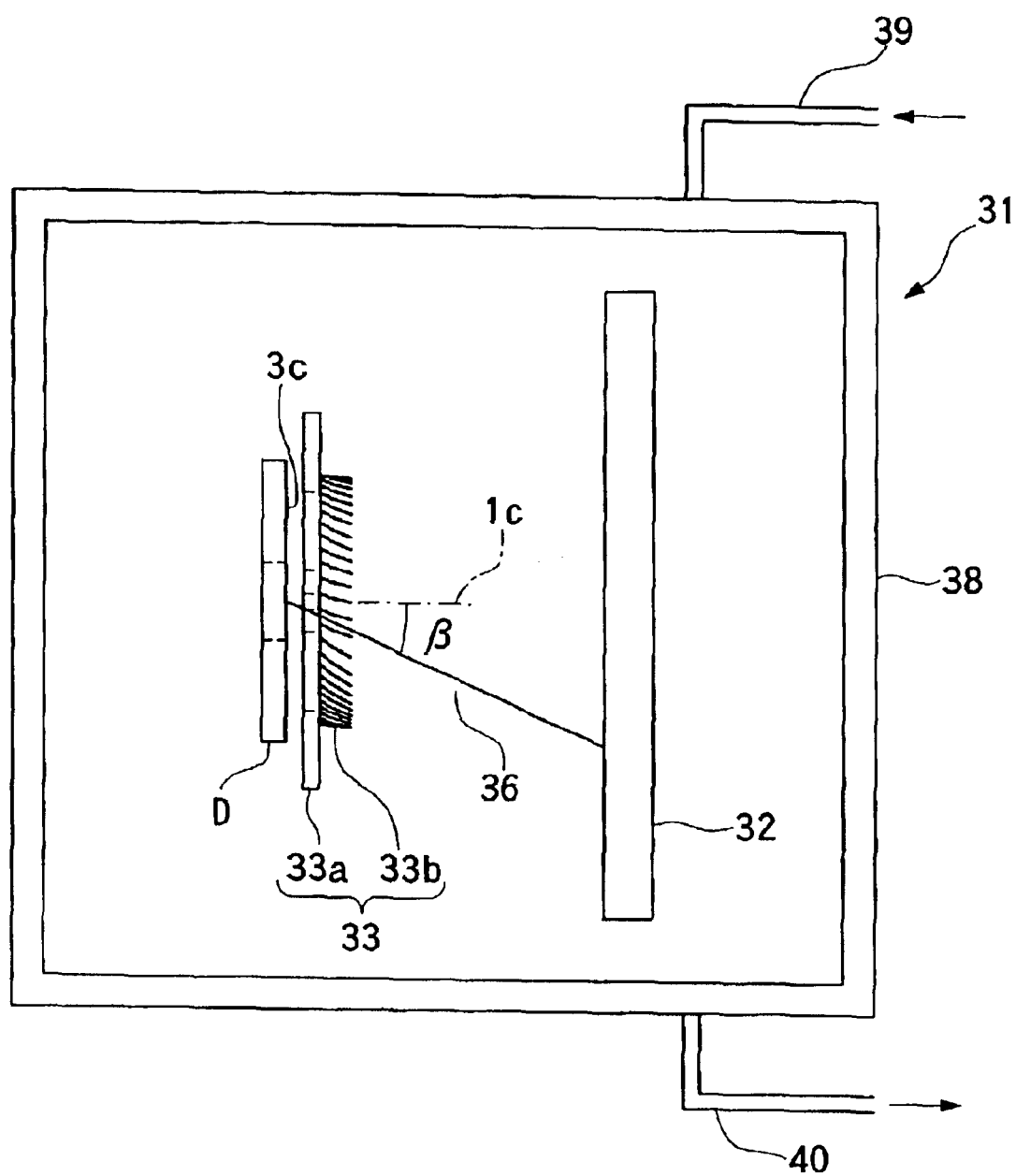
FIG. 6 is a schematic drawing showing another embodiment of the production apparatus for the magnetic recording medium of the present invention.
Figure 7:
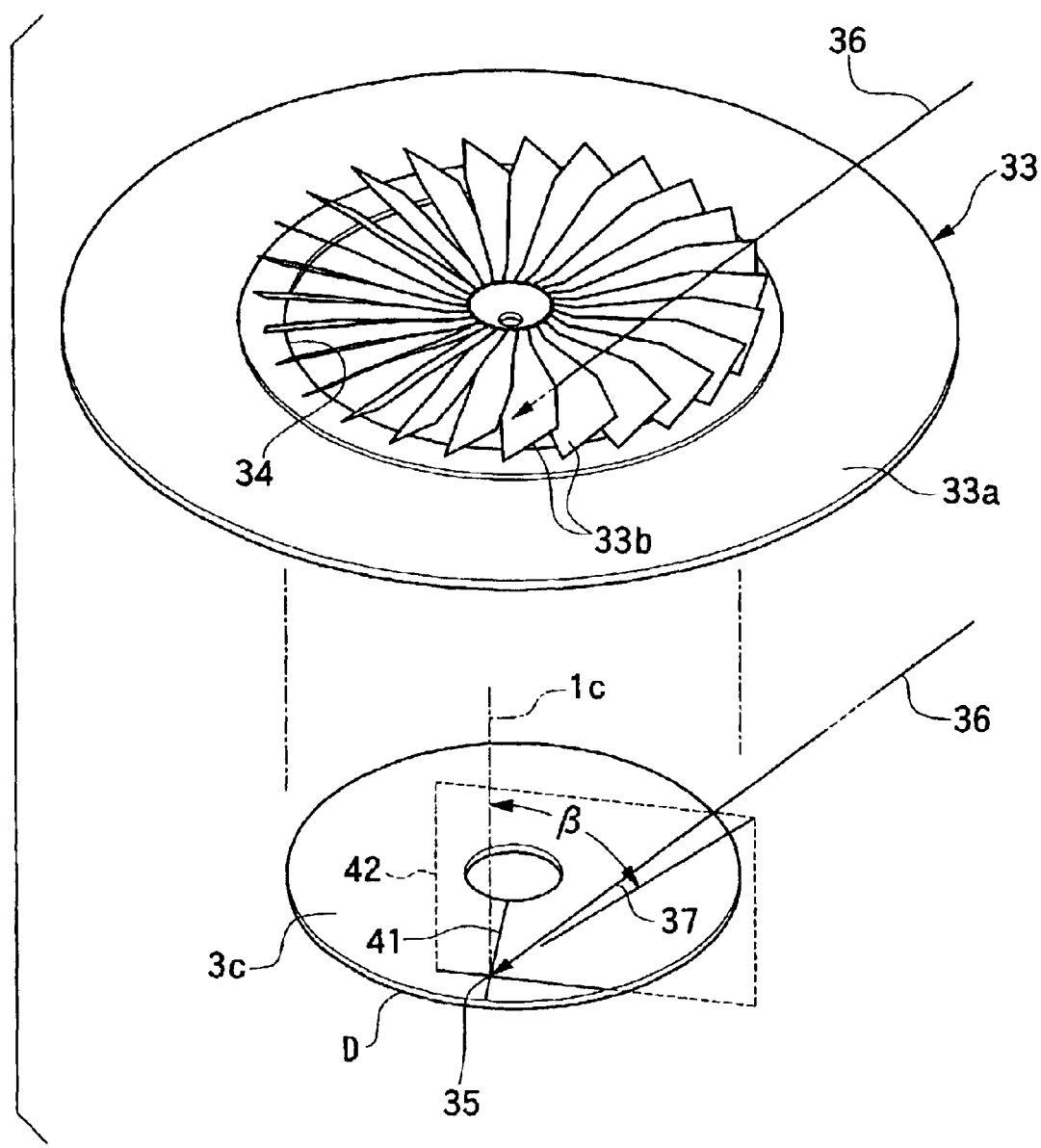
FIG. 7 is an explanatory view showing a method for producing the magnetic recording medium used in the production apparatus shown in FIG. 6.

FIGS. 6 and 7 show a sputtering apparatus 31 which forms a magnetic layer 4 having a crystal orientation in which the columnar fine crystal grains are inclined in the circumferential direction of the substrate.

The sputtering apparatus 31 shown here has a chamber 38 in which is provided a sputtering target 32 which serves as a release sourced for releasing film formation particles, and a shielding plate 33 which serves as a direction setting means for setting the direction of the film formation particles released from the sputtering target 32.

Reference symbol 39 is a feed line for feeding sputtering gas or the like into the chamber 38, and reference symbol 40 is a discharge line for discharging sputtering gas from inside the chamber 38 from the chamber 38.

The sputtering target 32 comprises the constituent material for the magnetic layer 4, and is formed in a disk-shape.

The shielding plate 33 is for determining the direction of the film formation particles by blocking the film formation particles, among those released from the sputtering target, which are released in directions other than the desired direction. The shielding plate 33 is provided with a disc-shaped plate 33a and a plurality of shielding plate main bodies 33b which is attached to the plate 33a.

A circular film formation particle through hole 34 is formed in the center portion of the plate 33a.

The shielding plate main body 33b has a thin plate shape which is formed such that the width gradually widens from one end to the other end, and is disposed along the radial direction of the through hole 34.

The shielding plate main body 33b is fixed to the plate 33a in a state wherein the end at which the width is narrow is disposed at the center portion of the through hole 34 and the other end at which the width is wide is disposed in the vicinity of the inner edge of the through hole 34.

The shielding plate main body 33b is fixed to the plate 33a in a state in which it is inclined in the circumferential direction of the plate 33a. A constitution is made in which only the film formation particles which have been released from the sputtering target 32 and which are directed along the shielding plate main body 33b (inclined direction in the circumferential direction) can pass through the space between the shielding plate bodies 33b.

The inclination angle of the shielding plate main body 33b is preferably set such that an incident angle β with respect to the non-magnetic substrate 1 of the film formation particles at the time of deposition of the released film formation particles onto the surface (deposition surface) 3c of the non-magnetic undercoat layer 3 is 10–75°. As will be described below, this incident angle β is an angle with respect to the line 1c perpendicular with respect to the non-magnetic substrate 1.

In order to increase the accuracy of the incident angle of the film formation particles, it is preferable if the shielding plate main body is formed to be as thin as possible. For example, for the case of using a 2.5-inch (63.5 mm) outer diameter non-magnetic substrate 1, the thickness of the shielding plate main body 33b is preferably 0.5–2 mm.

The use of a magnetic material that is superior in heat resistance and which has few impurities (e.g., stainless steel or an aluminum alloy) in the shielding plate main body 33b is preferred. In particular, the use of an aluminum alloy is preferable because the operation for removing deposited film formation particles is easy and inexpensive.

This plurality of shielding plate main bodies 33b are provided in the spaces along the circumferential direction of the through hole 34.

When forming the magnetic layer 4 using the sputtering apparatus 31, a disk D, having the non-magnetic undercoat layer 3 formed on the surface thereof, is introduced into the chamber 38, and is disposed on the opposite side of the shielding plate 33 with respect to the sputtering target 32 (left side in the figure).

The disk D is disposed such that its center axis is substantially coincident with the center axis of the shielding plate 33. The plate 33a of the shielding plate 33 is disposed substantially parallel with respect to the sputtering target 32.

Next, while feeding a sputtering gas such as argon into the chamber 38 through the feed line 39, electricity is supplied to the sputtering target 32 and film formation particles are released by means of sputtering.

Film formation particles which are released from the sputtering target 32 and directed along the shielding plate main body 33b (inclined direction in the circumferential direction of the substrate) are deposited on a surface 3c of the non-magnetic undercoat layer 3 by passing through the spaces between the shielding plate main bodies 33b, and particles released in directions other than this are blocked by the shielding plate main bodies 33b.

Reference symbol 32 in FIG. 7 indicates a surface which is perpendicular with respect to a radial direction 41 at a point 35 (film formation particle deposition point) for deposition of the film formation particles onto the surface 3c.

As shown in FIGS. 6 and 7, the film formation particles passing through the shielding plate 33 pass through the spaces between the shielding plate main bodies 33b. Therefore, a trajectory 36 thereof is inclined in the circumferential direction of the substrate 1.

In other words, a projection line 37 of the film formation particle trajectory 36 toward a perpendicular surface 42 is inclined with respect to the non-magnetic substrate 1. The incident angle β with respect to the non-magnetic substrate 1 of the film formation particles (angle of the projection line 37 with respect to the perpendicular line 1c to the non-magnetic substrate 1) is preferably 10–75°.

It is more preferable if this incident angle β is set to 15–75° (more preferably 20–75°, and even more preferably 25–55°).

When this incident angle β does not fall within the above range, the crystal orientation of the non-magnetic undercoat layer 3 and the magnetic layer 4 deteriorates, and the magnetic anisotropy decreases. Furthermore, from the standpoint of the structure of the apparatus, setting the incident angle β to within a range which exceeds the above range is difficult.

When forming the magnetic layer 4, it is preferable if the shielding plate 33 or disk D is rotated in the circumferential direction and if the film formation particle deposition amount is made uniform in the circumferential direction.

By forming the magnetic layer 4 using the sputtering apparatus 31, as shown in FIG. 3, the magnetic layer 4 has a crystal structure in which the columnar fine crystal grains grow in the above-mentioned incident direction of the film formation crystals, and are inclined in the circumferential direction.

Being grown under the influence of the orientation-adjustment layer 2, the non-magnetic undercoat layer 3 exhibits excellent crystal orientation. The non-magnetic undercoat layer 3 has a bcc structure, and the orientation plane (the predominant crystal orientation plane in the non-magnetic undercoat layer 3) is a (200) plane.

Since the non-magnetic undercoat layer 3 exhibits an excellent crystal orientation, the crystal orientation of the magnetic layer 4 formed thereon is enhanced. The first and second magnetic films 4a and 4b of the magnetic layer 4 have an hcp structure, and the orientation plane (the predominant crystal orientation plane in the magnetic layer 4) is a (110) plane.

The protective layer 5 may be formed through a plasma CVD method or sputtering.

When forming the lubrication layer 6, a method may be adopted which applies a lubricant such as a fluorine-containing liquid lubricant (e.g., perfluoropolyether) onto the protective layer 5 by a dipping method.

In the magnetic recording medium of the present embodiment, the magnetic layer 4 has a crystal structure in which the columnar fine crystal grains are inclined in the circumferential direction; therefore, the magnetic anisotropy of the magnetic layer 4 in the circumferential direction can be increased.

Since the magnetic anisotropy of the magnetic layer 4 in the circumferential direction is increased, the crystal magnetic anisotropy constant (Ku) can be increased, resulting in an improvement in thermal stability.

Since the magnetic anisotropy of the magnetic layer 4 in the circumferential direction can be increased, the half power width of an isolated read pulse can be reduced, and the resolution of the reproduction output can be enhanced. Therefore, the error rate can be improved.

When the magnetic anisotropy is increased, the coercive force and reproduction output can be enhanced. Therefore, noise characteristics such as SNR can be improved.

Furthermore, since the magnetic layer 4 includes the first and second magnetic films 4a and 4b, and has a structure such that antiferromagnetic coupling are formed therebetween, a state can be achieved in which the magnetization is reduced due to antiferromagnetic coupling between the magnetic films 4a and 4b.

Therefore, the volume of magnetic grains can be increased sufficiently without adversely affecting the noise characteristics and resolution, and thermal stabilization can be attained. Accordingly, thermal stability can further be increased.

In general, the strength of the antiferromagnetic coupling between two magnetic films is greatly affected by the thickness of an intermediate film provided between the magnetic films. For example, for the case when Ru is used in the intermediate film, when the thickness of the intermediate film is about 0.8 nm, the strength of the antiferromagnetic coupling between the magnetic films attains a maximum value. When the thickness of the intermediate film is slightly increased or decreased from the above thickness corresponding to the maximum value, the strength of the antiferromagnetic coupling is greatly reduced.

Therefore, for the case in which a magnetic layer has an antiferromagnetic coupling structure (AFC structure), when a film formed below the magnetic layer has large surface irregularities, the thickness of the intermediate film becomes non-uniform, the strength of the antiferromagnetic coupling is lowered locally, and thermal stability tends to become insufficient.

In contrast, in the magnetic recording medium of the present embodiment, since the magnetic anisotropy of the magnetic layer 4 can be enhanced, texturing is not required during production. Therefore, non-uniformity in the thickness of the intermediate film 4c, which is caused by surface irregularities formed through texturing, can be prevented, the strength of the antiferromagnetic coupling can be increased, and a satisfactory effect of enhancing thermal stability can be obtained.

Furthermore, since the magnetic recording medium of the present embodiment has a structure in which the orientation-adjustment layer 2 is formed between the non-magnetic substrate 1 and the non-magnetic undercoat layer 3, and the orientation-adjustment layer 2 has a crystal structure in which the columnar fine crystal grains 2a are inclined in the radial direction, the crystal orientation of the non-magnetic undercoat layer 3 and the magnetic layer 4 can be improved, and the magnetic anisotropy of the magnetic layer 4 in the circumferential direction can be increased.

Since the magnetic anisotropy of the magnetic film 4 in the circumferential direction can be increased, the crystal magnetic anisotropy factor (Ku) can be increased. Therefore, an improvement in thermal stability can be achieved.

Furthermore, since the surface smoothness of the orientation-adjustment layer 2 can be increased, the average surface roughness Ra of the medium is reduced, and excellent glide height characteristics can be obtained.

Since a texturing step is not necessary, the production process is simplified and production costs can be reduced.

In addition, since the crystal grains in the non-magnetic undercoat layer 3 become fine, and magnetic grains in the magnetic layer 4, which is grown under the influence of the undercoat layer 3, can become fine and uniform, it is possible to achieve a reduction in noise. Therefore, the noise characteristics can further be improved.

When the orientation-adjustment layer 2 is formed from a non-magnetic metal having an Fd3m structure, the crystal orientation of the non-magnetic undercoat layer 3 and the magnetic layer 4 is improved, and the magnetic anisotropy of the magnetic layer 4 can further be increased.

In the production process of the aforementioned embodiment, during formation of the magnetic layer 4, the direction of the film formation particles is set such that the projection line 37 of the film formation particle trajectory 36 to the surface 42 perpendicular to a radial direction at the film formation particle deposition point 35 is inclined with respect to the substrate 1.

Therefore, the magnetic layer 4 in which the columnar fine crystal grains are inclined in the circumferential direction can be easily formed, and the magnetic anisotropy of the magnetic layer 4 can be increased. Consequently, thermal stability can be enhanced.

Furthermore, magnetic characteristics, such as error rate and noise characteristics, can be enhanced, and excellent glide height characteristics can be obtained.

In the production process of the aforementioned embodiment, when film formation particles are released from the sputtering target 22 and deposited onto the surface 1a of the non-magnetic substrate 1, thereby forming the orientation-adjustment layer 2, the direction of the film formation particles is set such that the projection line 27 of the trajectory 26 of the film formation particles toward the non-magnetic substrate 1 lies substantially along the radial direction of the non-magnetic substrate 1, and is incident at an angle with respect to the non-metallic substrate 1. Therefore, the magnetic anisotropy of the magnetic layer 4 can be increased. Consequently, thermal stability can be enhanced.

Furthermore, magnetic characteristics, such as error rate and noise characteristics, can be enhanced, and excellent glide height characteristics can be obtained.

Since the magnetic anisotropy of the magnetic layer 4 can be enhanced without carrying out texturing, deterioration of glide height characteristics which is caused by an increase in the average surface roughness of the medium due to surface irregularities formed through texturing can be prevented.

In addition, since a texturing step is not necessary during production, the production process is simplified and production costs can be reduced.

Oxidation or nitrification of the surface of the orientation-adjustment layer 2 can cause the non-magnetic undercoat layer 3 to have an orientation plane of (200), further enhance the magnetic anisotropy of the magnetic layer 4, and improve the error rate, noise characteristics, thermal stability, and the like of the magnetic recording medium.

In the aforementioned production process, since the orientation-adjustment layer 2 is formed through sputtering by use of the sputtering target 22 as a release source of film formation particles, the orientation-adjustment layer 2 can be easily formed.

When oxidation or nitrification is carried out by a method which forms the orientation-adjustment layer 2 using an oxygen- or nitrogen-containing sputtering gas, formation of the orientation-adjustment layer 2, and oxidation or nitrification can be carried out in a single step, and thus the production step can be simplified. Consequently, operations are simplified and productivity can be enhanced.

When the oxidation or nitrification is carried out by bringing the surface of the orientation-adjustment layer 2 into contact with an oxygen-containing or nitrogen-containing gas, after the orientation-adjustment layer 2 is formed on the non-magnetic substrate 1 by use of the sputtering apparatus 21, and subsequently, without removal of a thus-formed medium substrate M (the non-magnetic substrate 1 and the orientation-adjustment layer 2 formed thereon) from the sputtering apparatus 21, the surface of the orientation-adjustment layer 2 can be subjected to oxidation or nitrification in the sputtering apparatus 21.

Therefore, shortening of the production steps, simplification of operations, and enhancement of productivity can be attained.

The aforementioned sputtering apparatus 31 includes the sputtering target 32 and the shielding plate 33 for setting the direction of the released film formation particles, and the shielding plate 33 is constituted such that only the film formation particles which are released in the direction along the shielding plate main body 33b (direction inclined in the circumferential direction) can pass in the space between the shielding plate main bodies 33b. Therefore, the incident direction of the particles with respect to the non-magnetic substrate 1 can be accurately set.

Therefore, the crystal orientation of the magnetic layer 4 is improved, and the magnetic anisotropy of the magnetic layer 4 can be reliably increased.

The above-mentioned sputtering apparatus 21 is provided with the sputtering target 22 which serves as the release source for film formation particles, and the shielding plate 23 which sets the direction of the released film formation particles. Therefore, the incident direction of the film formation particles with respect to the non-magnetic substrate 1 can be accurately set.

Therefore, the crystal orientation of the non-magnetic undercoat layer 3 and the magnetic layer 4 is improved, and the magnetic anisotropy of the magnetic layer 4 can be reliably increased.

In the above-mentioned embodiment, a magnetic recording medium having the orientation-adjustment layer 2 with a crystal structure in which the columnar fine crystal grains are inclined in the radial direction was given as an example. However, the magnetic recording medium of the present invention is not limited to this and may be one in which the orientation-adjustment layer 2 does not have an inclined crystal structure.

Regarding the non-magnetic undercoat layer 3 as well, a structure in which the columnar fine crystal grains 3a are inclined in the radial direction was given. However, it is not limited to this, and a constitution in which the crystal grains are not inclined is also possible.

In the magnetic recording medium of the above-mentioned embodiment, the columnar fine crystal grains 4d, 4e, and 4f have an inclined constitution in all of the first magnetic film 4a, the intermediate film 4c, and the second magnetic film 4b. However, the present invention is not limited to this, and a constitution may be adopted in which the columnar fine crystal grains are inclined in at least one of the first magnetic film 4a, the intermediate film 4c, and the second magnetic film 4b.

In particular, it is preferable if all of the magnetic films (the first magnetic film 4a and second magnetic film 4b, in this example) have a structure in which the crystal grains are inclined.

In the present invention, the orientation-adjustment layer may be composed from an NiP alloy having an amorphous structure (an amorphous NiP alloy).

FIG. 1A shows an example of the magnetic recording medium in which the orientation-adjustment layer comprises an amorphous NiP alloy.

A second embodiment of the magnetic recording medium of the present invention will be described with reference to this figure.

In the magnetic recording medium of the present embodiment, the orientation-adjustment layer 2 differs from that of the first embodiment in that point of being formed from an NiP alloy.

It is preferable if the Ni content of the orientation-adjustment layer 2 is 50–90 at %.

The orientation-adjustment layer 2 comprising an amorphous NiP alloy may be formed in a manner similar to that of the aforementioned production process.

Specifically, the sputtering apparatus 21 including the sputtering target 22, which comprises an amorphous NiP alloy, and the shielding plate 23 is employed, and film formation particles from the sputtering target 22 are deposited onto the surface 1a of the non-magnetic substrate 1 such that the incident angle α is preferably 10–75°.

When the orientation-adjustment layer 2 is formed, oxidation or nitrification is carried out in accordance with the aforementioned process, by employing an oxygen- or nitrogen-containing sputtering gas or by bringing the surface of the orientation-adjustment layer 2 into contact with an oxygen-containing or nitrogen-containing gas. Consequently, at least the surface of the orientation-adjustment layer 2 may be crystallized.

In this magnetic recording medium, the ratio of the coercive force in the circumferential direction of the magnetic layer 4 Hcc to the coercive force in the radial direction Hcr, i.e., Hcc/Hcr, is more than 1 (preferably 1.1 or more, and more preferably 1.2 or more).

In this magnetic recording medium, similar to the magnetic recording medium of the first embodiment, the crystal orientation of the non-magnetic undercoat layer 3 and the magnetic layer 4 is improved, and the magnetic anisotropy can be enhanced.

Therefore, magnetic characteristics, such as the error rate, noise characteristics, and thermal stability can be improved. In addition, the glide height characteristics can be improved.

Figure 8:
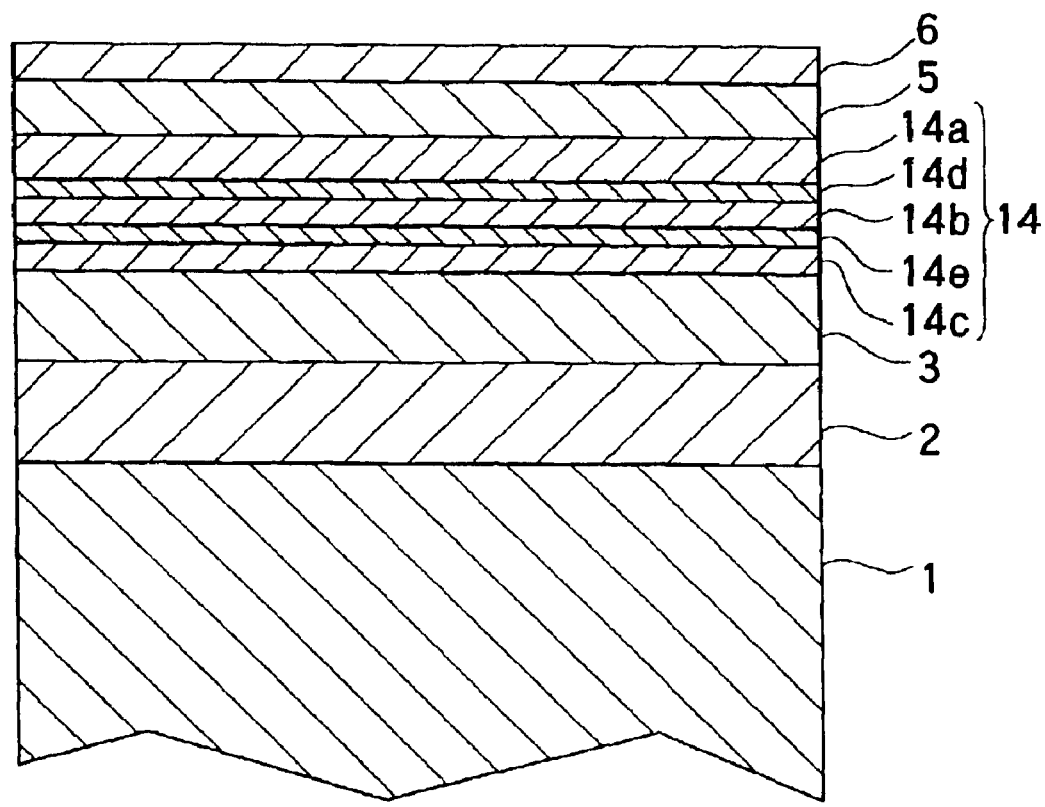
FIG. 8 is a partial cross-sectional view showing a third embodiment of the magnetic recording medium of the present invention.

FIG. 8 shows a third embodiment of the magnetic recording medium of the present invention. The magnetic recording medium shown here differs from that shown in FIG. 1 in that a magnetic layer 14 includes a first magnetic film 14a (uppermost film), a second magnetic film 14b, a third magnetic film 14c (lowermost film), a first intermediate film 14d provided between the first and second magnetic films 14a and 14b, and a second intermediate film 14e provided between the second and third magnetic films 14b and 14c.

The magnetic material exemplified as the material for the above-mentioned magnetic films 4a and 4b can be used in the first, second, and third magnetic films 14a, 14b, and 14c.

It is preferable if the coercive force of the first magnetic film 14a Hc1 is 2,000 (Oe) or more (preferably 3,000 (Oe) or more). When the coercive force Hc1 falls below the above range, thermal stability of the magnetic film 14a is lowered, resulting in lowering of the effect of enhancing thermal stability. It is preferable if the coercive force of the first magnetic film 14a Hc1 is set so as to be larger than coercive forces Hc2 and Hc3 of the second and third magnetic films 14b and 14c. In this case, the first magnetic film 14a serves as the primary magnetic film having the largest coercive force.

No particular limitations are imposed on the thicknesses of the first, second, and third magnetic films 14a, 14b, and 14c. However, when the thickness is very small, the volume of the magnetic grains decreases, which is disadvantageous in the point of thermal stability, whereas when the thickness is too large, magnetization of this layer becomes excessively large, potentially resulting in an increase in noise.

Therefore, the thickness of the first magnetic film 14a is preferably 1–40 nm (more preferably 5–30 nm), and the thickness of the second and third magnetic films 14b and 14c is preferably 1–20 nm (more preferably 1–10 nm).

The material and the thickness of the first and second intermediate films 14d and 14e may be similar to those of the aforementioned intermediate film 4c.

Similar to the magnetic layer 4 of the magnetic recording medium of the first embodiment, the magnetic layer 14 has a structure in which the columnar fine crystal grains are inclined in the circumferential direction.

This magnetic layer 14 may have a constitution in which the columnar fine crystal grains are inclined in all of the magnetic films 14a, 14b, and 14c, and intermediate films 14d and 14e. A structure can be adopted in which the columnar fine crystal grains are inclined in at least one of these films.

In particular, it is preferable if all of the magnetic films (magnetic films 14a, 14b, and 14c) have a structure in which the crystal grains are inclined.

In the magnetic recording medium of the present embodiment, preferably, the antiferromagnetic bonding magnetic field of the second magnetic film 14b adjacent to, via the intermediate film 14d, the first magnetic film 14a having the largest coercive force is larger than the coercive force of the magnetic film 14b.

This will be described below with reference to FIG. 9.

Figure 9A:
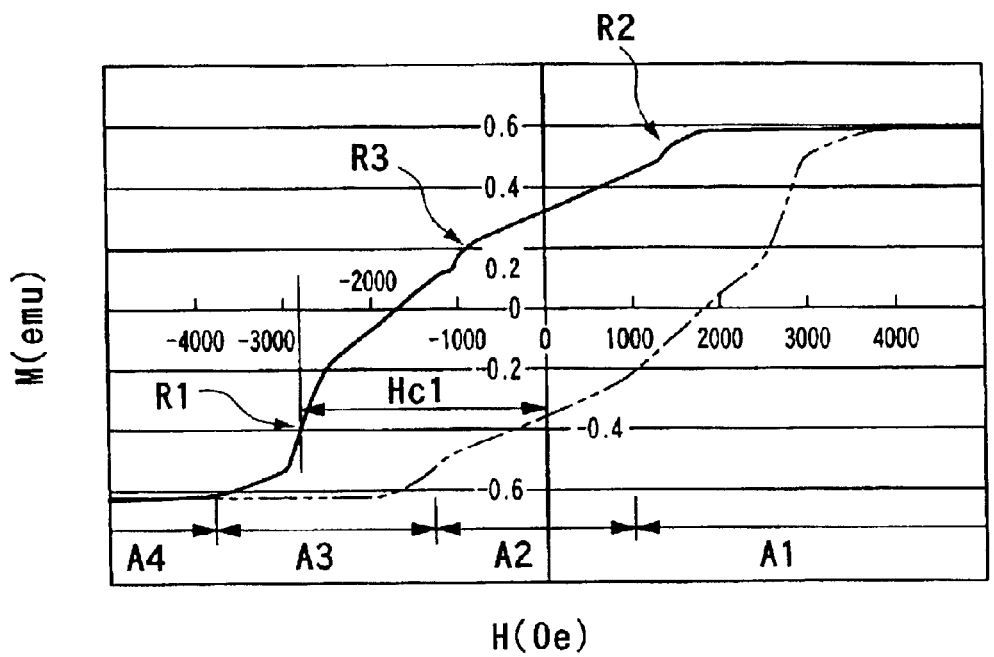
FIGS. 9A and 9B are graphs showing a hysteresis loop of the magnetic recording medium shown in FIG. 8.
Figure 9B:
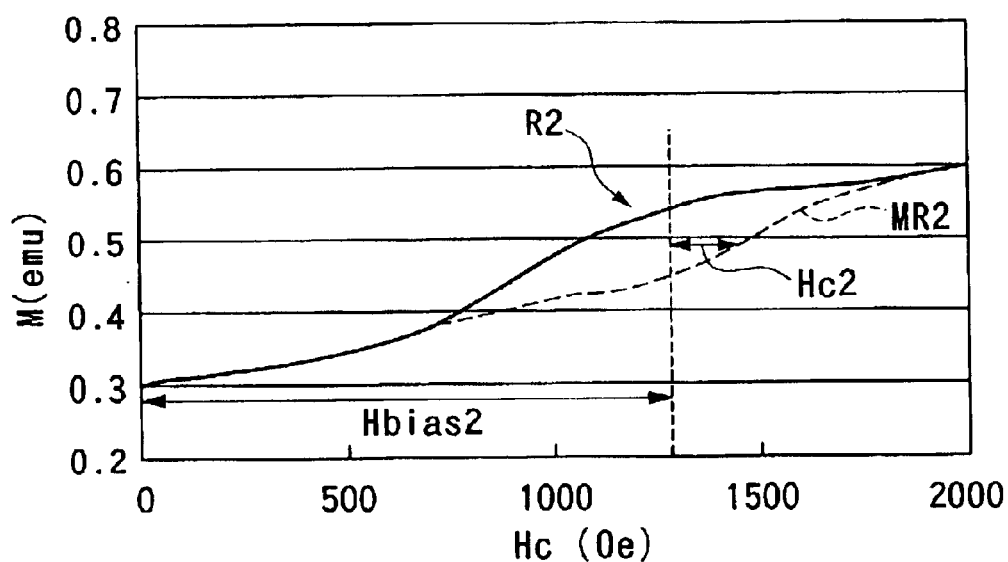

FIG. 9 shows a hysteresis loop of the magnetic recording medium of the present embodiment.

In this magnetic recording medium, since magnetization inversion occurs not only in the uppermost magnetic film (the first magnetic film 14a) but also individually in the other magnetic films (the second and third magnetic films 14b and 14c), the hysteresis loop has a plurality of steps (magnetization inversion portions).

Specifically, as shown in FIG. 9A, the curve formed by reducing an external magnetic field H is reduced results in a hysteresis loop which has a magnetization inversion portion R2 of the second magnetic film 14b (which is present in the first quadrant in which either of the external magnetic field H and magnetization M are positive), a magnetization inversion portion R3 of the third magnetic film 14c, and a magnetization inversion portion R1 of the first magnetic film 14a.

In the magnetization inversion portions R2, R3, and R1, the percent reduction in the decreasing magnetization rapidly increases when the external magnetic field H is reduced. The broken line in the figure shows a portion of the hysteresis loop (minor loop) formed while the external magnetic field H is increased and decreased in the vicinity of these magnetization inversion portions.

In this magnetic recording medium, within region A1 shown in the figure in which the external magnetic field H is sufficiently high, all three magnetic films are magnetized in the positive direction. However, when the external magnetic field H is reduced, the magnetization direction of the second magnetic film 14b is inverted in the magnetization inversion portion R2, and in region A2, the magnetization direction of the second magnetic film 14b is in the negative direction.

When the external magnetic field H is further reduced, the magnetization direction of the third magnetic film 14c is inverted in the magnetization inversion portion R3, and in region A3, the magnetization direction of the third magnetic film 14c is in the negative direction.

When the external magnetic field H is further reduced, the magnetization direction of the first magnetic film 14a is inverted in the magnetization inversion portion RI and is in the negative direction, and in region A4, the first magnetic film 14a is magnetized completely in the negative direction. Here, the coercive force of the entirety of the magnetic layer 14 Hc becomes substantially equal to the coercive force of the first magnetic film 14a Hc1, which has the largest coercive force. The external magnetic field H, in which the absolute value of the differential value of the hysteresis loop in the vicinity of the magnetization inversion portion R1 is the peak, is taken as the coercive force Hc1.

External magnetic fields, in which the absolute value of the differential value of the hysteresis loop (minor loop) MR2 in the vicinity of the magnetization inversion portion R2 is the peak, are taken as Hc2A and Hc2B, and the average value of Hc2A and Hc2B is taken as antiferromagnetic bonding magnetic field Hbias2. The difference between Hc2A and Hbias2 is taken as the coercive force of the second magnetic film 14b, Hc2.

In the magnetic recording medium shown here, the antiferromagnetic bonding magnetic field Hbias2, i.e., the external magnetic field H corresponding to the center of the hysteresis loop (minor loop) MR2 in the magnetization inversion portion R2 of the second magnetic film 14b, is larger than the coercive force Hc2 of the second magnetic film.

Therefore, when the magnetic field H is reduced from the state in which the magnetization directions of all three magnetic films are in the positive direction through application of the high external magnetic field H, the magnetization direction of the second magnetic film 14b is inverted reliably and directed in the negative direction due to antiferromagnetic coupling between the magnetic film 14b and the adjacent magnetic films 14a and 14c.

Therefore, during reproduction when the external magnetic field is zero because of the antiferromagnetic coupling, magnetization of the magnetic layer 14 is apparently set to the value obtained by subtracting the magnetization of the magnetic film 14b from the total magnetization of the magnetic films 14a, 14b, and 14c. Consequently, the magnetization of the entirety of the magnetic layer 14 is apparently reduced, and the effect of enhancing thermal stability can be obtained reliably, without causing deterioration of the noise characteristics and resolution.

In contrast, when the antiferromagnetic bonding magnetic field Hbias2 is smaller than the coercive force Hc2, the antiferromagnetic coupling between the magnetic films becomes insufficient. Therefore, even when the external magnetic field is zero, the magnetization direction of the second magnetic film 14b is not inverted, and the magnetization of the entirety of the magnetic layer 14 increases during reproduction. As a result, the noise characteristics and resolution may be adversely affected. In addition, since the antiferromagnetic coupling between the magnetic films is insufficient, the effect of increasing the effective volume of the magnetic grains is and there is a risk that the effect of enhancing thermal stability will decrease.

In the magnetic recording medium of the present embodiment, the magnetic layer 14 includes the first, second, and third magnetic films 14a, 14b, and 14c, and the first and second intermediate films 14d and 14e. Therefore, as compared with the magnetic recording medium of the first embodiment including two magnetic films (see FIG. 1), the thickness of the magnetic film 14a can be reduced without decreasing the effective volume of the magnetic grains of the entirety of the magnetic layer 14.

Consequently, thermal stability can be enhanced, disturbances of magnetization directions in the magnetic film 14a can be restrained, and the noise characteristics and resolution during recording and reproduction can be improved.

In the magnetic recording medium of this embodiment, there are two laminated structures each comprising the magnetic film and the intermediate film adjacent thereto (a first laminated structure comprising the magnetic film 14b and the intermediate film 14d, and a second laminated structure comprising the magnetic film 14c and the intermediate film 14e). However, in the present invention, the magnetic layer may be constituted to have three or more laminated structures each comprising the magnetic film and the intermediate film adjacent thereto.

In this case, the effective volume of the magnetic grains of the magnetic film can be further increased, and thus thermal stability can be enhanced.

Figure 10:
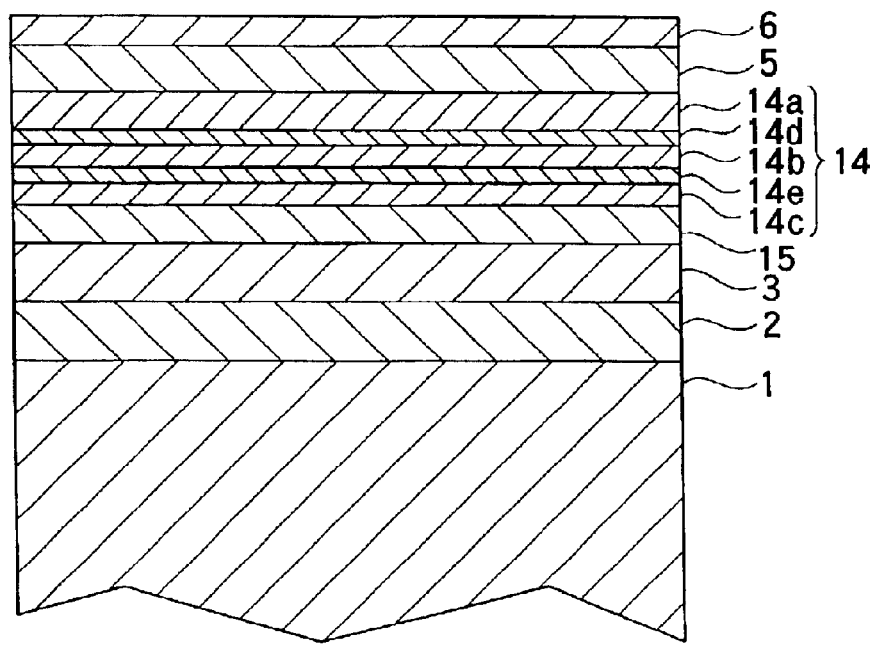
FIG. 10 is a partial cross-sectional view showing a fourth embodiment of the magnetic recording medium of the present invention.

FIG. 10 shows a fourth embodiment of the magnetic recording medium of the present invention. The magnetic recording medium shown here includes a non-magnetic intermediate layer 15 provided between the non-magnetic undercoat layer 3 and the magnetic layer 14.

A non-magnetic material having an hcp structure is preferably used in the non-magnetic intermediate layer 15. A CoCr-based alloy is preferably used in the non-magnetic intermediate layer 15. An alloy of CoCr and one or more species selected from among Pt, Ta, ZrNb, Cu, Re, Ni, Mn, Ge, Si, O, N, and B can be used.

In order to prevent an increase in the size of magnetic grains of the magnetic layer 14, the thickness of the non-magnetic intermediate layer 15 is preferably 20 nm or less (more preferably 10 nm or less).

In the magnetic recording medium of the present embodiment, since the non-magnetic intermediate layer 15 is provided, the orientation of the magnetic layer 14 can be enhanced, and thermal stability can be further improved.

Similar to the orientation-adjustment layer 2, the non-magnetic undercoat layer 3, and the magnetic layer 4 shown in FIG. 1 to FIG. 3, the non-magnetic intermediate layer 15 can be constituted to have a crystal structure in which the columnar fine crystal grains are inclined in the radial direction or the circumferential direction.

The inclination angle of the columnar fine crystal grains can be set in a similar manner as that of the columnar fine crystal grains of the orientation-adjustment layer 2, the non-magnetic undercoat layer 3, and the magnetic layer 4.

When forming the non-magnetic intermediate layer 15 having a crystal structure in which the columnar fine crystal grains are inclined in the radial direction or the circumferential direction, a method similar to the method of forming the orientation-adjustment layer 2, the non-magnetic undercoat layer 3, and the magnetic layer 4 can be adopted.

By this means, the magnetic anisotropy of the magnetic layer 14 can be further enhanced, and thermal stability can be improved.

Figure 11:
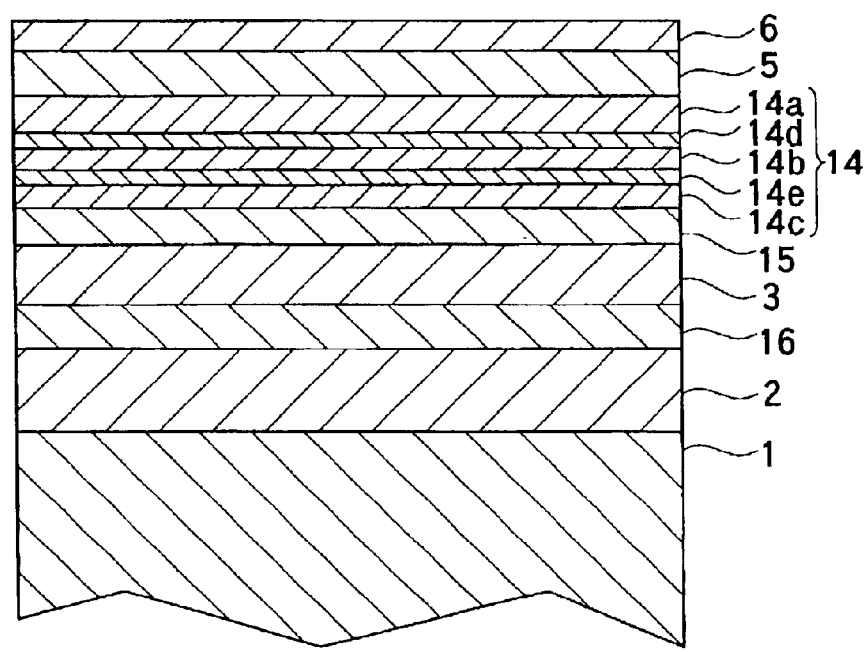
FIG. 11 is a partial cross-sectional view showing a fifth embodiment of the magnetic recording medium of the present invention.

FIG. 11 shows a fifth embodiment of the magnetic recording medium of the present invention. The magnetic recording medium shown here includes a second undercoat layer 16 provided between the orientation-adjustment layer 2 and the non-magnetic undercoat layer 3. Cr or a Cr alloy can be used in this second undercoat layer 16.

In this magnetic recording medium, the crystal orientation of the non-magnetic undercoat layer 3 and the magnetic layer 14 can be improved, and the magnetic anisotropy of the magnetic layer 14 can further be enhanced.

Similar to the orientation-adjustment layer 2, the non-magnetic undercoat layer 3, and the magnetic layer 4 shown in FIG. 1 to FIG. 3, the second undercoat layer 16 can also be constituted to have a crystal structure in which the columnar fine crystal grains are inclined in the radial direction or the circumferential direction.

The inclination angle of the columnar fine crystal grains can be set in a similar manner to that of the columnar fine crystal grains of the orientation-adjustment layer 2, the non-magnetic undercoat layer 3, and the magnetic layer 4.

When forming the second undercoat layer 16 having a crystal structure in which the columnar fine crystal grains are inclined in the radial direction or the circumferential direction, a method similar to the method of forming the orientation-adjustment layer 2, the non-magnetic undercoat layer 3, and the magnetic layer 4 can be adopted.

By this means, the magnetic anisotropy of the magnetic layer 14 can be further enhanced, and thermal stability can be improved.

Figure 12:
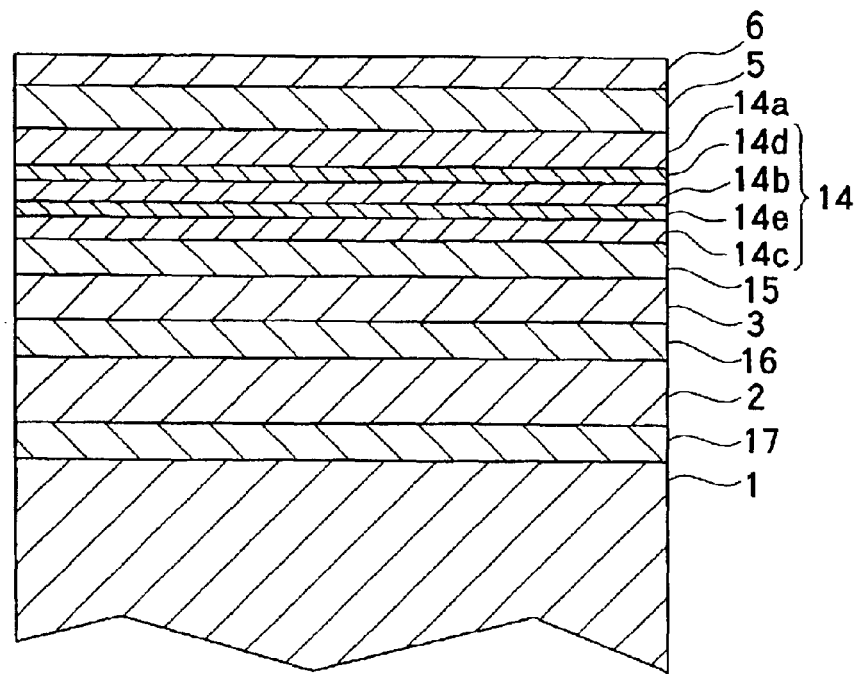
FIG. 12 is a partial cross-sectional view showing a sixth embodiment of the magnetic recording medium of the present invention.

FIG. 12 shows a sixth embodiment of the magnetic recording medium of the present invention. The magnetic recording medium shown here includes an orientation-enhancing layer 17 provided between the non-magnetic substrate 1 and the orientation-adjustment layer 2.

The orientation-enhancing layer 17 is provided for adjusting the orientation of the orientation-adjustment layer 2 and for preventing peeling of the orientation-adjustment layer 2 from the substrate. An alloy predominantly containing one or more elements selected from among Cr, Mo, Nb, V, Re, Zr, W, and Ti, for example, as the main component can be used as the material for the orientation-enhancing layer 17. Particularly, Cr or a CrMo-, CrTi-, CrV-, or CrW-based alloy can be used.

A material having a B2 structure or an amorphous structure can be used.

Examples of the material having a B2 structure include NiAl-based alloys (e.g., Ni50Al), CoAl-based alloys (e.g., Co50Al), and FeAl-based alloys (e.g., Fe50Al).

CuZr-, TiCu-, NbNi- and NiP-based alloys can be used as the material having an amorphous structure.

Preferred, specific examples of the material of the orientation-enhancing layer 17 include a material predominantly containing any one of NiAl, FeAl, CoAl, CoZr, CoCrZr, and CoCrC.

The thickness of the orientation-enhancing layer 17 is preferably 200 nm or less, for example, 5–200 nm. When the thickness exceeds 200 nm, the effect of enhancing the magnetic anisotropy of the magnetic layer 14 is lowered.

In the magnetic recording medium of the present embodiment, since the orientation-enhancing layer 17 is provided, disturbance of the orientation in the initial growth stage of the orientation-adjustment layer 2 is prevented, the crystal orientation of the non-magnetic undercoat layer 3 and the magnetic layer 14 is improved, and the magnetic anisotropy of the magnetic layer 14 can be further enhanced. Therefore, thermal stability can be further enhanced.

In addition, peeling of the orientation-adjustment layer 2 from the non-magnetic substrate 1 can be prevented.

In the present invention, as described below, a plurality of orientation-adjustment layers can be provided.

Figure 13:
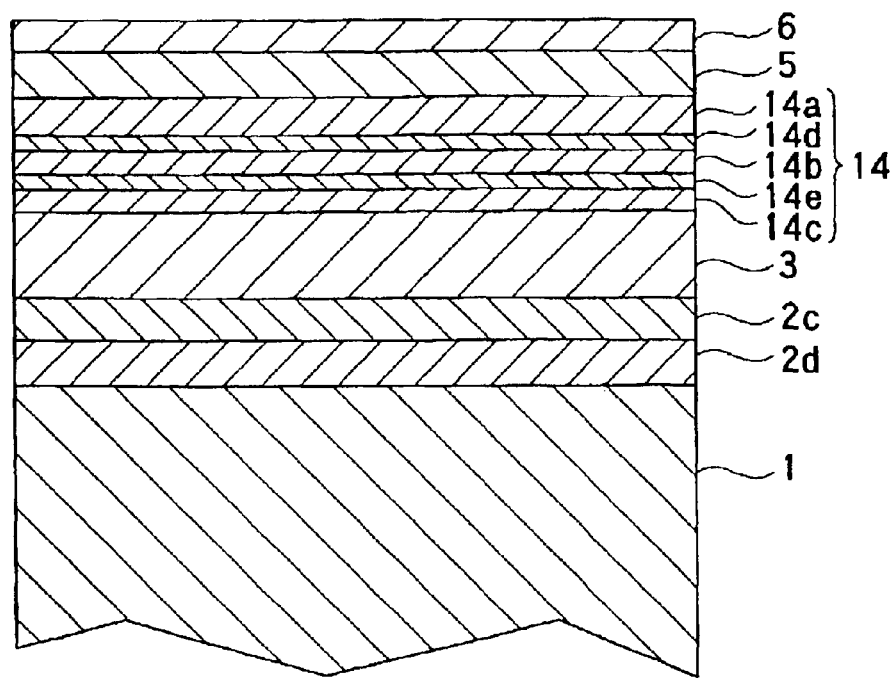
FIG. 13 is a partial cross-sectional view showing a seventh embodiment of the magnetic recording medium of the present invention.

FIG. 13 shows a seventh embodiment of the magnetic recording medium of the present invention. The magnetic recording medium shown here differs from the magnetic recording medium shown in FIG. 8 in the point that first and second orientation-adjustment layers 2c and 2d are provided instead of the orientation-adjustment layer 2.

The material and the thickness of the orientation-adjustment layers 2c and 2d may be similar to those of the orientation-adjustment layer 2 of the magnetic recording medium shown in FIG. 1. The number of orientation-adjustment layers can be set to be three or more.

As described below, the magnetic recording medium of the present invention may have a structure in which a non-magnetic undercoat layer is not provided and a magnetic layer is formed directly on the orientation-adjustment layer.

Figure 14:
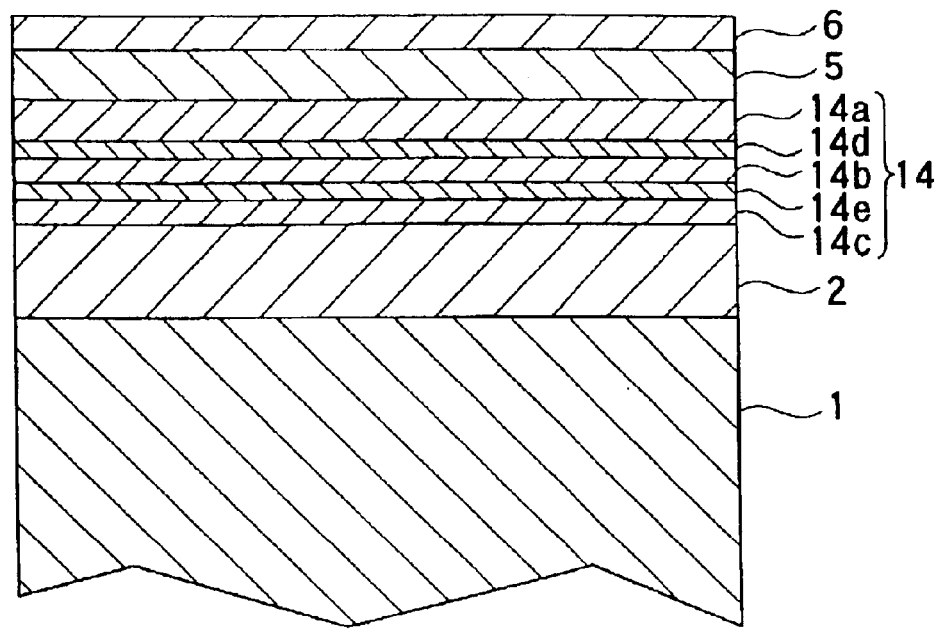
FIG. 14 is a partial cross-sectional view showing an eighth embodiment of the magnetic recording medium of the present invention.

FIG. 14 shows an eighth embodiment of the magnetic recording medium of the present invention. The magnetic recording medium shown here differs from the magnetic recording medium shown in FIG. 8 in the point that the non-magnetic undercoat layer 3 is not formed.

In this magnetic recording medium, the crystal orientation of the magnetic layer 14 can be improved, and the magnetic anisotropy of the magnetic layer 14 in the circumferential direction can be enhanced, resulting in an improvement in thermal stability.

In the present invention, the magnetic layer may have a single-layer structure formed from a single material. In this case, the material which can be used in the aforementioned magnetic films 4a and 4b can be used as the material.

Figure 15:
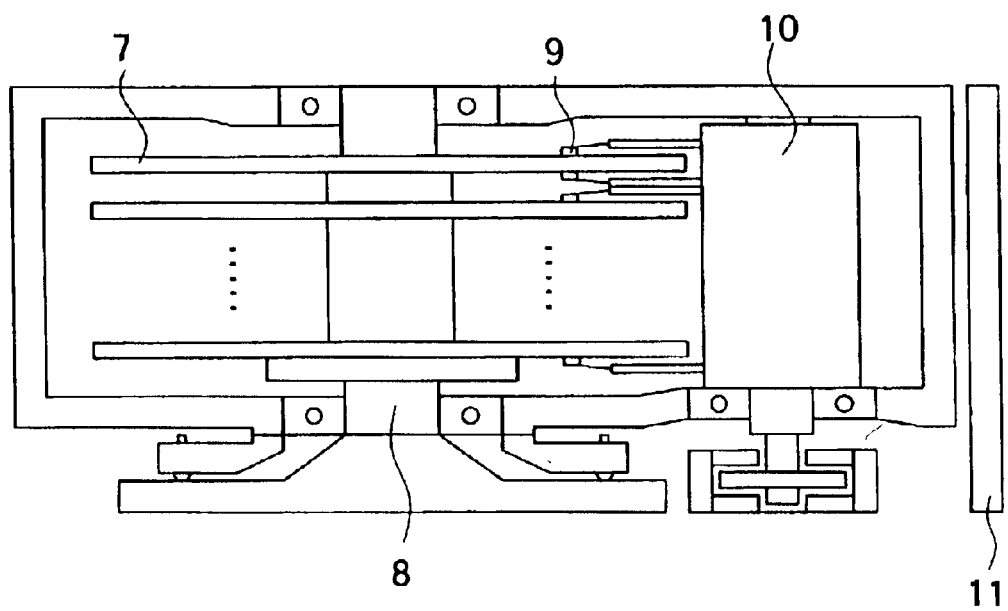
FIG. 15 is a partial cross-sectional view showing an embodiment of the magnetic recording and reproducing apparatus of the present invention.

FIG. 15 shows an example of a magnetic recording and reproducing apparatus which uses the aforementioned magnetic recording medium. The magnetic recording and reproducing apparatus shown here includes a magnetic recording medium 7 having the aforementioned structure, a medium-driving section 8 which rotationally drives the magnetic recording medium 7, a magnetic head 9 for recording data onto the magnetic recording medium 7 and for reproducing the data, a head-driving section 10, and a recorded/reproduced signal processing system 11. The recorded/reproduced signal processing system 11 is capable of processing data which has been input, sending a recorded signal to the magnetic head 9, or processing reproduction signals from the magnetic head 9 and outputting data.

Since the magnetic anisotropy of the magnetic recording medium can be enhanced by this magnetic recording and reproducing apparatus, thermal stability is enhanced, and problems, including loss of recorded data attributed to thermal decay, can be obviated.

In addition, magnetic characteristics, such as error rate and noise characteristics, can be improved, and excellent glide height characteristics can be obtained. Therefore, high recording density can be attained.

Figure 16:
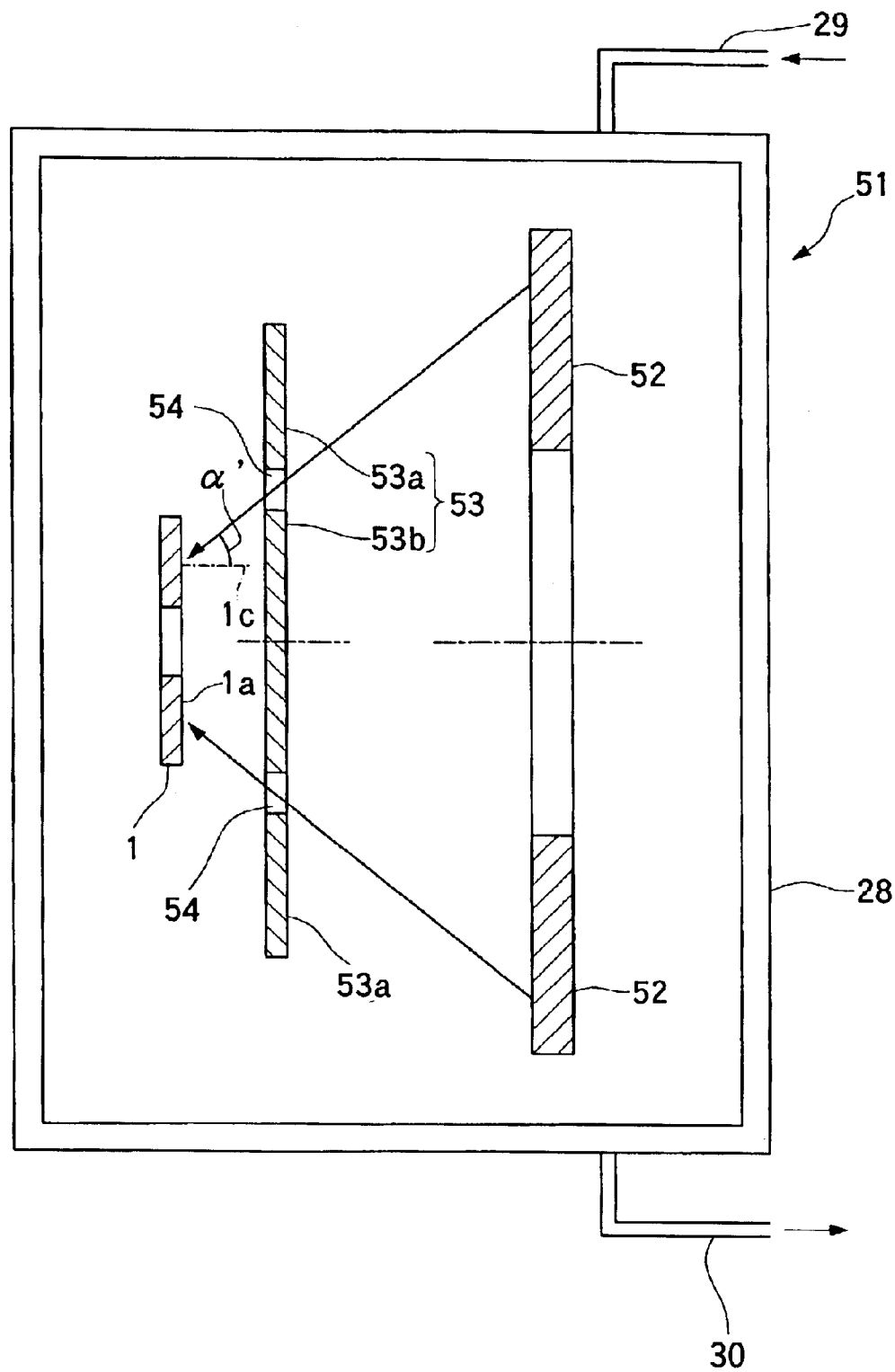
FIG. 16 is a schematic drawing showing another embodiment of the production apparatus for the magnetic recording medium of the present invention.

FIG. 16 shows another embodiment of the apparatus for producing the magnetic recording medium of the present invention. A sputtering apparatus 51 shown here differs from the sputtering apparatus 21 in the point that a sputtering target 52 serving as a release source of film formation particles is formed in an annular shape, and that a shielding plate 53 comprises an annular outer shielding plate 53a and a disk-shaped inner shielding plate 53b provided in the aperture of the shielding plate 53a.

The shielding plate 52 is formed such that the outer diameter of the inner shielding plate 53b is smaller than the inner diameter of the outer shielding plate 53a, and a film formation through slit 34 through which film formation particles pass is formed between the inner peripheral edge of the outer shielding plate 53a and the outer peripheral edge of the inner shielding plate 53b.

The inner diameter of the outer shielding plate 53a and the outer diameter of the inner shielding plate 53b are set such that the film formation particles are incident on the non-magnetic substrate 1 at an angle (preferably, such that the incident angle α' is 10–75°) when the released film formation particles are deposited onto the non-magnetic substrate 1.

When the orientation-adjustment layer 2 is formed by use of the sputtering apparatus 51, film formation particles which have been released from the sputtering target 52 and have passed through the film formation through slit 54 are deposited onto the surface 1a of the non-magnetic substrate 1 such that the incident angle α' is preferably 10–75° with respect to the non-magnetic substrate 1.

By this means, it is possible to form the orientation-adjustment layer 2 having columnar fine crystal grains which are inclined in the radial direction.

Furthermore, by the use of this sputtering apparatus 51, it is possible to form the non-magnetic undercoat layer 3 having columnar fine crystal grains 3a which are inclined in the radial direction.

In the present invention, instead of sputtering, any physical vapor deposition method such as vacuum deposition, gas sputtering, gas-flow sputtering, or an ion-beam method may be used as the method to form the orientation-adjustment layer.

In the aforementioned embodiments, regarding the coercive force of the entirety of the magnetic layer Hc, the ratio of the coercive force in the circumferential direction Hcc to the coercive force in the radial direction Hcr, i.e., Hcc/Hcr was used as an index of magnetic anisotropy, but the present invention is not limited to this. Regarding the coercive force of each magnetic film constituting the magnetic layer (e.g., the coercive force Hc2 of the second magnetic film 14b), the ratio of the coercive force in the circumferential direction to the coercive force in the radial direction may be used as an index of magnetic anisotropy.

EXAMPLES

The present invention will next be described in detail by way of specific examples.

Test Example 1

Through sputtering by use of a DC magnetron sputtering apparatus (Model 3010, product of ANELVA), on a non-magnetic substrate (amorphous glass, diameter: 65 mm, thickness: 0.635 mm) were formed an orientation-enhancing layer comprising 50Ni50Al (50 at % Ni-50 at % Al), a non-magnetic undercoat layer (thickness: 10 nm) comprising 94Cr6Mo (94 at % Cr-6 at % Mo), a non-magnetic intermediate layer (thickness: 2 nm) comprising 60Co40Cr (60 at % Co-40 at % Cr), a magnetic layer (thickness: 18 nm) comprising 64Co22Cr10Pt4B (64 at % Co-22 at % Cr-10 at % Pt-4 at % B), and a protective layer (thickness: 6 nm) comprising carbon. Subsequently, a lubrication layer comprising perfluoroether was formed by means of dipping.

During film formation, the pressure inside the chamber of the sputtering apparatus was reduced to $2\times10^{-6}$ Pa. The non-magnetic substrate 1 was heated to 200° C. Argon gas was used as the sputtering gas.

Test Example 2

A magnetic layer was formed so as to have a structure including a first magnetic film (thickness: 18 nm) comprising 64Co22Cr10Pt4B, second and third magnetic films (thickness: 2.5 nm) each comprising 84Co12Cr4Ta, and first and second intermediate films (thickness: 0.8 nm) each comprising Ru and being provided between the magnetic films, to thereby produce a magnetic recording medium. Other conditions corresponded to those of Test Example 1.

Test Example 3

Without providing an orientation-enhancing layer comprising NiAl, a second undercoat layer (thickness: 10 nm) comprising Cr was provided between a non-magnetic substrate and a non-magnetic undercoat layer, to thereby produce a magnetic recording medium. Other conditions corresponded to those of Test Example 1.

Test Example 4

An orientation-adjustment layer (thickness: 20 nm) comprising 70Cr30Nb was formed, to thereby produce a magnetic recording medium.

During formation of the orientation-adjustment layer, the sputtering apparatus 21 was used, and the direction of the film formation particles was set such that the projection line 27 of the trajectory 26 of the film formation particles toward the non-magnetic substrate 1 lied substantially along the radial direction of the non-magnetic substrate 1, and such that the incident angle was 10–75° with respect to the non-magnetic substrate 1. During the formation of the orientation-adjustment layer, a gas mixture in which 25 vol % of nitrogen was added to argon was used as the sputtering gas. Other conditions corresponded to those of Test Example 3.

Test Examples 5 through 7

A magnetic recording medium as shown in FIG. 11 was produced as follows.

Through sputtering by use of a DC magnetron sputtering apparatus (Model 3010, product of ANELVA), on a non-magnetic substrate 1 (amorphous glass, diameter: 65 mm, thickness: 0.635 mm) were formed an orientation-adjustment layer 2 (thickness: 20 nm) comprising 70Cr30Nb, a second undercoat layer 16 (thickness: 10 nm) comprising Cr, a non-magnetic undercoat layer 3 (thickness: 10 nm) comprising 94Cr6Mo, a non-magnetic intermediate layer 15 (thickness: 2 nm) comprising 60Co40Cr, a magnetic layer 14, and a protective layer 5 (thickness: 6 nm) comprising carbon. Subsequently, a lubrication layer 6 comprising perfluoroether was formed by means of dipping.

The magnetic layer 14 was formed so as to have a structure including first, second, and third magnetic films 14a, 14b, and 14c (thickness: 18 nm, 2.5 nm, and 2.5 nm, respectively), and first and second intermediate films 14d and 14e (thickness of each film: 0.8 nm) provided between the magnetic films.

64Co22Cr10Pt4B was used in the first magnetic film 14a, 84Co12Cr4Ta was used in the second and third magnetic films 14b and 14c, and Ru was used in the intermediate films 14d and 14e.

During formation of the orientation-adjustment layer 2, the sputtering apparatus 21 was used, and the direction of the film formation particles was set such that the projection line 27 of the trajectory 26 of the film formation particles toward the non-magnetic substrate 1 lied substantially along the radial direction of the non-metallic substrate 1, and such that the incident angle was 10–75° with respect to the non-magnetic substrate 1. During formation of the orientation-adjustment layer 2, a gas mixture in which 25 vol % of nitrogen was added to argon was used as the sputtering gas. Other conditions corresponded to those of Test Example 4.

Test Example 8

A magnetic layer 4 was formed so as to have a structure including first and second magnetic films 4a and 4b (thickness: 18 nm and 2.5 nm, respectively), and an intermediate film 4c (thickness: 0.8 nm) provided between the magnetic films, to thereby produce a magnetic recording medium.

64Co22Cr10Pt4B was used in the first magnetic film 4a, 84Co12Cr4Ta was used in the second magnetic film 4b, and Ru was used in the intermediate film 4c. Other conditions corresponded to those of Test Examples 5 through 7.

Test Examples 9 through 13

The magnetic recording medium shown in FIG. 10 was produced as follows.

On a non-magnetic substrate 1 (crystallized glass, diameter: 65 mm, thickness: 0.635 mm) were formed an orientation-adjustment layer 2 (thickness: 20 nm) comprising 70Cr30Nb, a non-magnetic undercoat layer 3 (thickness: 10 nm) comprising 85Cr15Mo, a non-magnetic intermediate layer 15 (thickness: 2 nm) comprising 60Co40Cr, a magnetic layer 14, a protective layer 5 (thickness: 6 nm) comprising carbon, and a lubrication layer 6.

When forming the orientation-adjustment layer 2, the sputtering apparatus 21 was used, and the direction of the film formation particles was set such that the projection line 27 of the trajectory 26 of the film formation particles toward the non-magnetic substrate 1 lied substantially along the radial direction of the non-magnetic substrate 1, and such that the incident angle was 10–75° with respect to the non-magnetic substrate 1. During formation of the orientation-adjustment layer 2, a gas mixture in which 25 vol % of nitrogen was added to argon was used as the sputtering gas. Other conditions corresponded to those of Test Examples 5 through 7.

Magnetostatic characteristics of the magnetic recording media of Test Examples 1 through 13 were measured by use of a vibrating sample magnetometer (VSM). The ratio of the coercive force in the circumferential direction of the entirety of the magnetic layer Hcc to the coercive force in the radial direction Hcr, i.e., Hcc/Hcr, was measured, and the ratio was regarded as an index of magnetic anisotropy.

In each of Test Examples 9 through 13, a hysteresis loop was formed, and the coercive force Hc2 and antiferromagnetic bonding magnetic field Hbias2 of the second magnetic film 14b were obtained by use of the hysteresis loop.

Electromagnetic conversion characteristics were measured by use of a read/write analyzer RWA1632 and spin stand S1701 MP (products of Guzik). In order to evaluate the electromagnetic conversion characteristics, measurement was performed by use of a complex-type thin film magnetic recording head containing a giant magnetoresistive (GMR) element at the reproduction portion, with the recording conditions being such that the track-recording density was set at 600 kFCI.

Regarding thermal stability (thermal demagnetization), the output reduction at a recording density of 300 kFCI at 70° C. was measured by use of the spin stand S1701 MP.

The predominant crystal orientation planes of the non-magnetic undercoat layer and magnetic layer of the magnetic recording medium were specified by means of a θ/2θ method using an X-ray diffraction measurement apparatus.

The production conditions and the test results are shown in Tables 1 through 4, shown below.

Test Example 14

On a non-magnetic substrate 1 were formed an orientation-enhancing layer 17 comprising NiAl, a non-magnetic undercoat layer 3 comprising 94Cr6Mo, a non-magnetic intermediate layer 15 comprising 60Co40Cr, a magnetic layer 14, a protective layer 5 comprising carbon, and a lubrication layer 6, to thereby produce a magnetic recording medium. Other conditions corresponded to those of Test Examples 9 through 13.

Test Example 15

An orientation-enhancing layer 17 comprising NiP was provided, the surface of the orientation-enhancing layer 17 was subjected to texturing along the circumferential direction, and thereon were formed a second undercoat layer 16 comprising Cr, a non-magnetic intermediate layer 15 comprising 60Co40Cr, a magnetic layer 14, a protective layer 5 comprising carbon, and a lubrication layer 6, to thereby produce a magnetic recording medium. Other conditions corresponded to those of Test Example 14.

Test Example 16

The magnetic recording medium shown in FIG. 12 was produced as follows.

An orientation-enhancing layer 17 comprising Co30Cr10Zr was provided on a non-magnetic substrate 1, and thereon were formed an orientation-adjustment layer 2 comprising Cr25V, a second undercoat layer 16 comprising Cr, a non-magnetic undercoat layer 3 comprising 94Cr6Mo, a non-magnetic intermediate layer 15 comprising 60Co40Cr, a magnetic layer 14, a protective layer 5 comprising carbon, and a lubrication layer 6, to thereby produce a magnetic recording medium.

When forming the orientation-adjustment layer 2, the sputtering apparatus 21 was used, and the direction of the film formation particles was set such that the projection line 27 of the trajectory 26 of the film formation particles toward the non-magnetic substrate 1 lied substantially along the radial direction of the non-magnetic substrate 1, and such that the incident angle was 10–75° with respect to the non-magnetic substrate 1. During formation of the orientation-adjustment layer 2, a gas mixture in which 25 vol % of nitrogen was added to argon was used as the sputtering gas. Other conditions corresponded to those of Test Example 14.

Test Example 17

A substrate on which an NiP-plated layer was formed on the surface of an aluminum alloy (NiP aluminum alloy) was used as the substrate 1, and on the substrate 1 were formed a second undercoat layer 16 comprising Cr, a non-magnetic undercoat layer 3 comprising 94Cr6Mo, a non-magnetic intermediate layer 15 comprising 60Co40Cr, a magnetic layer 14, a protective layer 5 comprising carbon, and a lubrication layer 6, to thereby produce a magnetic recording medium. Other conditions corresponded to those of Test Example 14.

Test Example 18

A magnetic recording medium was produced by carrying out the same procedure as that of Test Example 17, except that the surface of the substrate 1 was subjected to texturing along the circumferential direction.

Test Example 19

A magnetic recording medium was produced by carrying out the same procedure as that of Test Example 16, except that a substrate comprising aluminum was used as the substrate 1.

Test Example 20

A magnetic recording medium was produced by carrying out the same procedure as that of Test Example 18, except that a layer (thickness: 18 nm) comprising 64Co22Cr10Pt4B was formed as the magnetic layer.

The magnetostatic characteristics of the magnetic recording medium of each of Test Examples 14 through 20 were measured by use of a vibrating sample magnetometer (VSM). The ratio of the coercive force in the circumferential direction of the entirety of the magnetic layer Hcc to the coercive force in the radial direction Hcr, i.e., Hcc/Hcr, was measured, and the ratio was regarded as an index of magnetic anisotropy.

Electromagnetic conversion characteristics were measured by use of a read/write analyzer RWA1632 and spin stand S1701 MP (products of Guzik). In order to evaluate the electromagnetic conversion characteristics, measurement was performed by use of a complex-type thin film magnetic recording head containing a giant magnetoresistive (GMR) element at the reproduction portion, with the recording conditions being such that the track-recording density was set at 600 kFCI.

One recording track was divided into 512 sectors, these 128 sectors were each divided into 4 regions, the electromagnetic conversion characteristics were evaluated for each region, and variations in the reproduction output signal (LFTAA) and SNR in the recording tracks were evaluated. Evaluation of the electromagnetic conversion characteristics was performed at positions 20 mm and 30 mm radially.

The production conditions and the test results are shown in Tables 5 and 6, shown below.

Test Example 21

On a non-magnetic substrate 1 (crystallized glass, diameter: 65 mm, thickness: 0.635 mm) were formed an orientation-adjustment layer 2 (thickness: 20 nm) comprising 45Ni55Nb, a second undercoat layer 16 (thickness: 10 nm) comprising Cr, a non-magnetic undercoat layer 3 (thickness: 10 nm) comprising 80Cr20V, a non-magnetic intermediate layer 15 (thickness: 2 nm) comprising 60Co40Cr, a magnetic layer (thickness: 17 nm) comprising 66Co21Cr9Pt4B, a protective layer 5 (thickness: 6 nm) containing carbon, and a lubrication layer 6, thereby producing a magnetic recording medium.

When forming the orientation-adjustment layer 2, the sputtering apparatus 21 was used, and the direction of the film formation particles was set such that the projection line 27 of the trajectory 26 of the film formation particles toward the non-magnetic substrate 1 lied substantially along the radial direction of the non-magnetic substrate 1, and such that the incident angle was 10–75° with respect to the non-magnetic substrate 1. During formation of the orientation-adjustment layer 2, a gas mixture in which 15 vol % of nitrogen was added to argon was used as the sputtering gas.

Test Examples 22 through 27

A magnetic recording medium was produced by carrying out the same procedure as that of Test Example 21, except that a magnetic layer was used having in which a laminated structure comprising a lower magnetic film (thickness: 2 nm) comprising 83Co14Cr3Ta and an intermediate film (thickness: 0.8 nm) comprising Ru was laminated one to six times, and an uppermost magnetic film (thickness: 17 nm) comprising 66Co21Cr9Pt4B was formed on the resultant laminate.

Test Examples 28 through 36

The magnetic recording medium shown in FIG. 11 was produced as follows.

An orientation-adjustment layer 2 was formed from a material shown in Table 7 shown below, and a non-magnetic undercoat layer 3 was formed from 94Cr6Mo, to thereby produce a magnetic recording medium.

A magnetic layer was formed so as to have a configuration in which a laminated structure including a magnetic film (second and third magnetic films 14b, 14c) comprising 83Co14Cr3Ta and an intermediate film (intermediate films 14d, 14e) comprising a material shown in Table 7 was laminated two times, and a magnetic film (first magnetic film 14a) (thickness: 17 nm) comprising 66Co21Cr9Pt4B was provided on the resultant laminate. Other conditions corresponded to those of Test Example 21.

Test Examples 37 through 58

The material and thickness of the orientation-enhancing layer 17 and orientation-adjustment layer 2 are as shown in Table 8, shown below. A magnetic recording medium was produced by subjecting the surface of the orientation-adjustment layer 2 to oxidation or nitrification by means of a method shown in Table 8.

The non-magnetic undercoat layer 3 (thickness: 5 nm) was formed from 80Cr20W, and the non-magnetic intermediate layer 15 (thickness: 2 nm) was formed from 63Co37Cr.

The magnetic layer was formed so as to have a configuration in which a third magnetic film 14c (thickness: 5 nm) comprising 73Co18Cr6Pt3Ta, a second intermediate film 14e (thickness: 0.8 nm) comprising Ru, a second magnetic film 14b (thickness: 2.5 nm) comprising 84Co12Cr4Ta, a first intermediate film 14d (thickness: 0.6 nm) comprising Ru, and a first magnetic film 14a (thickness: 18 nm) comprising from 64Co22Cr10Pt4B were laminated successively. Other conditions corresponded to those of Test Example 21.

In the table, a method for oxidation or nitrification is shown in the column "oxidation/nitrification". For example, "20 vol % $N_2$/Ar" refers to the case when a gas in which the nitrogen content is 20 vol %, with the remainder being Ar was used as the sputtering gas, and "$O_2$ gas exposure" refers to the case when a process of exposing the orientation-adjustment layer 2 to oxygen gas (pure oxygen) was carried out.

The magnetostatic characteristics and electromagnetic conversion characteristics of the magnetic recording media of Test Examples 21 through 58 were measured. The production conditions and the test results are shown in Tables 7 and 8 shown below.

In the aforementioned Test Examples 1–58, when forming the magnetic layer and magnetic films, the incident direction of the film formation particles was set to the circumferential direction. In other words, the direction of the film formation particles was set such that the projection line 37 of the film formation particle trajectory 36 toward the surface 42 perpendicular to the radial direction 41 at the film formation particle deposition point 35 was inclined with respect to the non-magnetic substrate 1, and such that the incident angle β was 10–75°.

Test Examples 59 through 80

An NiP aluminum substrate or glass substrate was used as the substrate 1, and a magnetic recording medium having the constitution shown in Tables 9 and 10, shown below, was produced. Other conditions corresponded to those of Test Example 21.

The magnetostatic characteristics and electromagnetic conversion characteristics of the magnetic recording media of Test Examples 59 through 80 were measured. The production conditions and test results are shown in Tables 9 and 10, shown below.

In the magnetic recording medium of each of the aforementioned test examples, it is clear from observing, by means of TEM, the cross section of a medium in which the incident direction of the film formation particles was set to the radial direction during film formation that the medium has a crystal structure in which the columnar fine crystal grains are inclined 10–75° in the radial direction.

It is clear from observing, by means of TEM, the cross section of a medium in which the incident direction of the film formation particles was set to the circumferential direction that the medium has a crystal structure in which the columnar fine crystal grains are inclined 10–75° in the circumferential direction.

TABLE 1

| | Substrate | Orientation-enhancing layer | | Orientation-adjustment layer | | Second undercoat layer | | Non-magnetic undercoat layer | | Non-magnetic intermediate layer |
|---|---|---|---|---|---|---|---|---|---|---|
| | | Composition | Thickness | Composition | Thickness | Composition | Thickness | Composition | Thickness | |
| Test Ex. 1 | Glass | NiAl | 50 | — | — | — | — | Cr6Mo | 10 | (*1) |
| Test Ex. 2 | Glass | NiAl | 50 | — | — | — | — | Cr6Mo | 10 | (*1) |
| Test Ex. 3 | Glass | — | — | — | — | Cr | 10 | Cr6Mo | 10 | (*1) |
| Test Ex. 4 | Glass | — | — | Cr30Nb | 20 | Cr | 10 | Cr6Mo | 10 | (*1) |
| Test Ex. 5 | Glass | — | — | Cr30Nb | 20 | Cr | 10 | Cr6Mo | 10 | (*1) |
| Test Ex. 6 | Glass | — | — | Cr30Nb | 20 | Cr | 10 | Cr6Mo | 10 | (*1) |
| Test Ex. 7 | Glass | — | — | Cr30Nb | 20 | Cr | 10 | Cr6Mo | 10 | (*1) |
| Test Ex. 8 | Glass | — | — | Cr30Nb | 20 | Cr | 10 | Cr6Mo | 10 | (*1) |

| | Magnetic Film | | | | | | | |
|---|---|---|---|---|---|---|---|---|
| | Third magnetic film | | Second intermediate film | | Second magnetic film | | First intermediate film | | First magnetic film |
| | Composition | Thickness | Composition | Thickness | Composition | Thickness | Composition | Thickness | |
| Test Ex. 1 | — | — | — | — | — | — | — | — | (*2) |
| Test Ex. 2 | Co12Cr4Ta | 2.5 | Ru | 0.8 | Co12Cr4Ta | 2.5 | Ru | 0.8 | (*2) |
| Test Ex. 3 | — | — | — | — | — | — | — | — | (*2) |
| Test Ex. 4 | — | — | — | — | — | — | — | — | (*2) |
| Test Ex. 5 | Co12Cr4Ta | 2.5 | Ru | 0.8 | Co12Cr4Ta | 2.5 | Ru | 0.8 | (*2) |
| Test Ex. 6 | Co12Cr4Ta | 2.5 | Ru | 1.4 | Co12Cr4Ta | 2.5 | Ru | 1.4 | (*2) |
| Test Ex. 7 | Co12Cr4Ta | 2.5 | Ru | 0.5 | Co12Cr4Ta | 2.5 | Ru | 0.5 | (*2) |
| Test Ex. 8 | — | — | — | — | Co12Cr4Ta | 2.5 | Ru | 0.8 | (*2) |

(*1): non-magnetic intermediate layer = composition: Co40Cr, thickness: 2 nm
(*2): first magnetic film = composition: Co22Cr10Pt4B, thickness: 18 nm
(units of thickness: nm)

TABLE 2

| | Coercive force Hc (*1) (Oe) | Magnetostatic characteristics | | PW50 (nS) | SNR (dB) | Thermal demagnet-ization (%/decade) | Non-magnetic undercoat layer | | Magnetic layer | |
|---|---|---|---|---|---|---|---|---|---|---|
| | | Magnetic anisotropy Hcc/Hcr (-) | Mrt (T·nm) | | | | Orientation plane | Crystal structure | Orientation plane | Crystal structure |
| Test Ex. 1 | 3213 | 1 | 0.35 | 16.77 | 16.31 | 0.85 | 112 | bcc | 100 | hcp |
| Test Ex. 2 | 3471 | 1 | 0.35 | 16.56 | 16.74 | 0.7 | 112 | bcc | 100 | hcp |
| Test Ex. 3 | 2213 | 1 | 0.27 | 16.93 | 12.9 | 0.98 | 110 | bcc | 101 | hcp |
| Test Ex. 4 | 3631 | 1.3 | 0.39 | 15.18 | 19.08 | 0.42 | 200 | bcc | 110 | hcp |
| Test Ex. 5 | 3829 | 1.3 | 0.39 | 14.83 | 19.34 | 0.26 | 200 | bcc | 110 | hcp |
| Test Ex. 6 | 3721 | 1.25 | 0.42 | 16.55 | 21.51 | 0.83 | 200 | bcc | 110 | hcp |
| Test Ex. 7 | 3694 | 1.27 | 0.41 | 16.11 | 17.95 | 0.35 | 200 | bcc | 110 | hcp |
| Test Ex. 8 | 3785 | 1.3 | 0.34 | 14.26 | 20.57 | 0.34 | 200 | bcc | 110 | hcp |

Hcc/Hcr: ratio of coercive force in circumferential direction Hcc to coercive force in radial direction Hcr
Mrt: product of residual magnetization and film thickness of the magnetic layer
PW50: half power width of isolated read pulse
SNR: signal/noise ratio
(*1): coercive force of the entirety of the magnetic layer

TABLE 3

| | Substrate | Orientation-adjustment layer | | Non-magnetic undercoat layer | | Non-magnetic intermediate layer |
|---|---|---|---|---|---|---|
| | | Composition | Thickness | Composition | Thickness | |
| Test Ex. 9 | Glass | Cr30Nb | 20 | Cr15Mo | 10 | (*1) |
| Test Ex. 10 | Glass | Cr30Nb | 20 | Cr15Mo | 10 | (*1) |
| Test Ex. 11 | Glass | Cr30Nb | 20 | Cr15Mo | 10 | (*1) |
| Test Ex. 12 | Glass | Cr30Nb | 20 | Cr15Mo | 10 | (*1) |
| Test Ex. 13 | Glass | Cr30Nb | 20 | Cr15Mo | 10 | (*1) |

| | Magnetic layer | | | | | | | | |
|---|---|---|---|---|---|---|---|---|---|
| | Third magnetic film | | Second intermediate film | | Second magnetic film | | First intermediate film | | First magnetic film | |
| | Composition | Thickness | Composition | Thickness | Composition | Thickness | Composition | Thickness | Composition | Thickness |
| Test Ex. 9 | Co12Cr4Ta | 2 | Ru | 0.8 | Co12Cr4Ta | 2 | Ru | 0.8 | Co22Cr10Pt4B | 18 |
| Test Ex. 10 | Co12Cr4Ta | 2.5 | Ru | 0.8 | Co12Cr4Ta | 2.5 | Ru | 0.8 | Co22Cr10Pt4B | 18 |
| Test Ex. 11 | Co12Cr4Ta | 3 | Ru | 0.8 | Co12Cr4Ta | 3 | Ru | 0.8 | Co22Cr10Pt4B | 18 |
| Test Ex. 12 | Co12Cr4Ta | 4 | Ru | 0.8 | Co12Cr4Ta | 4 | Ru | 0.8 | Co22Cr10Pt4B | 18 |
| Test Ex. 13 | Co12Cr4Ta | 5 | Ru | 0.8 | Co12Cr4Ta | 5 | Ru | 0.8 | Co22Cr10Pt4B | 18 |

(*1): non-magnetic intermediate layer = composition: Co40Cr, thickness: 2 nm
(units of thickness: nm)

TABLE 4

| | Coercive force Hc (*1) (Oe) | Magnetostatic characteristics | | PW50 (nS) | SNR (dB) | Thermal demagnet-ization (%/decade) | Non-magnetic undercoat layer | | Magnetic layer | | Second magnetic film Coercive force Hc2 (*2) (Oe) | Antiferromagnetic bonding magnetic field Hbias2 (*3) (Oe) |
|---|---|---|---|---|---|---|---|---|---|---|---|---|
| | | Magnetic anisotropy Hcc/Hcr (-) | Mrt (T·nm) | | | | Orientation plane | Crystal structure | Orientation plane | Crystal structure | | |
| Test Ex. 9 | 3875 | 1.3 | 0.39 | 14.92 | 19.21 | 0.27 | 200 | bcc | 110 | hcp | 56 | 1490 |
| Test. Ex. 10 | 3868 | 1.3 | 0.39 | 14.87 | 19.38 | 0.26 | 200 | bcc | 110 | hcp | 70 | 1370 |

TABLE 4-continued

| | Coercive force | Magnetostatic characteristics | | | | Thermal demagnet- | Non-magnetic undercoat layer | | Magnetic layer | | Second magnetic film | Antiferro- magnetic bonding |
| | | Magnetic | | | | ization | | | | | Coercive | magnetic |
| | Hc (*1) (Oe) | anisotropy Hcc/Hcr (-) | Mrt (T · nm) | PW50 (nS) | SNR (dB) | (%/ decade) | Orien- tation plane | Crystal structure | Orien- tation plane | Crystal structure | force Hc2 (*2) (Oe) | field Hbias2 (*3) (Oe) |
|---|---|---|---|---|---|---|---|---|---|---|---|---|
| Test. Ex. 11 | 3872 | 1.3 | 0.39 | 14.89 | 19.34 | 0.25 | 200 | bcc | 110 | hcp | 175 | 1230 |
| Test Ex. 12 | 3852 | 1.3 | 0.39 | 14.93 | 19.17 | 0.23 | 200 | bcc | 110 | hcp | 470 | 800 |
| Test Ex. 13 | 3742 | 1.3 | 0.41 | 16.11 | 17.95 | 0.30 | 200 | bcc | 110 | hcp | 690 | 440 |

Hcc/Hcr: ratio of coercive force in circumferential direction Hcc to coercive force in radial direction Hcr
Mrt: product of residual magnetization and film thickness of the magnetic layer
PW50: half power width of isolated read pulse
SNR: signal/noise ratio
(*1): coercive force of the entirety of the magnetic layer Hc
(*2): coercive force of the second magnetic film Hc2
(*3): antiferromagnetic bonding of the second magnetic film Hbias2

TABLE 5

| | Sub- strate | Orientation- enhancing layer (*1) | | Texture | Orientation- adjustment layer | | Second undercoat layer | | Non- magnetic undercoat layer | Non- magnetic inter- mediate layer |
| | | Compo- sition | Thick- ness | | Compo- sition | Thick- ness | Compo- sition | Thick- ness | | |
|---|---|---|---|---|---|---|---|---|---|---|
| Test Ex. 14 | Glass | NiAl | 20 | — | — | — | — | — | (*2) | (*3) |
| Test Ex. 15 | Glass | NiP | 20 | ○ | — | — | Cr | 10 | (*2) | (*3) |
| Test Ex. 16 | Glass | CoCrZr | 20 | — | Cr25V | 20 | Cr | 10 | (*2) | (*3) |
| Test Ex. 17 | Aluminum | — | — | — | — | — | Cr | 10 | (*2) | (*3) |
| Test Ex. 18 | Aluminum | — | — | ○ | — | — | Cr | 10 | (*2) | (*3) |
| Test Ex. 19 | Aluminum | CoCrZr | 20 | — | Cr25V | 20 | Cr | 10 | (*2) | (*3) |
| Test Ex. 20 | Aluminum | — | — | ○ | — | — | Cr | 10 | (*2) | (*3) |

| | Magnetic Layer | | | | | | | |
| | Third magnetic film | | Second inter- mediate film | | Second magnetic film | | First inter- mediate film | | First magnetic film |
| | Compo- sition | Thick- ness | Compo- sition | Thick- ness | Compo- sition | Thick- ness | Compo- sition | Thick- ness | |
|---|---|---|---|---|---|---|---|---|---|
| Test Ex. 14 | Co12Cr4Ta | 2.5 | Ru | 0.8 | Co12Cr4Ta | 2.5 | Ru | 0.8 | (*4) |
| Test Ex. 15 | Co12Cr4Ta | 2.5 | Ru | 0.8 | Co12Cr4Ta | 2.5 | Ru | 0.8 | (*4) |
| Test Ex. 16 | Co12Cr4Ta | 2.5 | Ru | 0.8 | Co12Cr4Ta | 2.5 | Ru | 0.8 | (*4) |
| Test Ex. 17 | Co12Cr4Ta | 2.5 | Ru | 0.8 | Co12Cr4Ta | 2.5 | Ru | 0.8 | (*4) |
| Test Ex. 18 | Co12Cr4Ta | 2.5 | Ru | 0.8 | Co12Cr4Ta | 2.5 | Ru | 0.8 | (*4) |
| Test Ex. 19 | Co12Cr4Ta | 2.5 | Ru | 0.8 | Co12Cr4Ta | 2.5 | Ru | 0.8 | (*4) |
| Test Ex. 20 | — | — | — | — | — | — | — | — | (*4) |

(*1): CoCrZr = Co30Cr10Zr
(*2): non-magnetic undercoat layer = composition: Cr6Mo, thickness: 10 nm
(*3): non-magnetic intermediate layer = composition: Co40Cr, thickness: 2 nm
(*4): first magnetic layer = composition: Co22Cr10Pt4B, thickness: 18 nm
In Test Example 15, an undercoat layer comprising Cr was provided between the substrate and the orientation-enhancing layer (NiP).

TABLE 6

| | Magnetic anisotropy Hcc/Hcr (-) | | 20 mm radial position | | | | 30 mm radial position | | | | Standard deviation |
|---|---|---|---|---|---|---|---|---|---|---|---|
| | | | First region | Second region | Third region | Fourth region | First region | Second region | Third region | Fourth region | |
| Test Ex. 14 | 1 | LFTAA (μV) | 1320 | 1324 | 1319 | 1322 | 1321 | 1317 | 1322 | 1320 | 2.1339 |
| | | SNR (dB) | 16.72 | 16.74 | 16.71 | 16.75 | 16.72 | 16.74 | 16.73 | 16.75 | 0.0149 |
| Test Ex. 15 | 1.3 | LFTAA (μV) | 1470 | 1511 | 1491 | 1458 | 1455 | 1423 | 1440 | 1483 | 28.4451 |
| | | SNR (dB) | 19.02 | 18.69 | 18.8 | 19.05 | 19.03 | 19.21 | 19.15 | 18.65 | 0.2101 |
| Test Ex. 16 | 1.31 | LFTAA (μV) | 1485 | 1481 | 1484 | 1487 | 1487 | 1485 | 1488 | 1486 | 2.1998 |
| | | SNR (dB) | 19.57 | 19.58 | 19.58 | 19.57 | 19.56 | 19.57 | 19.56 | 19.56 | 0.0083 |
| Test Ex. 17 | 1 | LFTAA (μV) | 1020 | 1024 | 1014 | 1027 | 987 | 991 | 990 | 985 | 18.1088 |
| | | SNR (dB) | 15.82 | 15.79 | 15.84 | 15.75 | 15.76 | 15.77 | 15.73 | 15.74 | 0.0389 |
| Test Ex. 18 | 1.3 | LFTAA (μV) | 1491 | 1476 | 1454 | 1534 | 1446 | 1489 | 1451 | 1439 | 31.7085 |
| | | SNR (dB) | 19.09 | 19.21 | 19.14 | 19.1 | 19.12 | 18.69 | 18.99 | 19.1 | 0.1596 |
| Test Ex. 19 | 1.29 | LFTAA (μV) | 1490 | 1491 | 1492 | 1490 | 1488 | 1487 | 1488 | 1490 | 1.6903 |
| | | SNR (dB) | 19.62 | 19.62 | 19.61 | 19.62 | 19.63 | 19.62 | 19.62 | 19.62 | 0.0053 |
| Test Ex. 20 | 1.3 | LFTAA (μV) | 1490 | 1492 | 1495 | 1491 | 1488 | 1485 | 1488 | 1489 | 3.0119 |
| | | SNR (dB) | 18.99 | 18.92 | 18.95 | 19.02 | 18.87 | 18.93 | 18.74 | 18.88 | 0.0861 |

Hcc/Hcr: ratio of coercive force in circumferential direction Hcc to coercive force in radial direction Hcr
LFTAA: reproduction output signal (low frequency)
SNR: signal/noise ratio
First region: sector 0–127
Second region: sector 128–255
Third region: sector 256–383
Fourth region: sector 384–511

TABLE 7

| | Orientation-adjustment layer | | Second undercoat layer | | Non-magnetic undercoat layer | | Non-magnetic intermediate layer |
|---|---|---|---|---|---|---|---|
| | Composition | Thickness | Composition | Thickness | Composition | Thickness | |
| Test Ex. 21 | 45Ni55Nb | 20 | Cr | 10 | Cr20V | 10 | (*1) |
| Test Ex. 22 | 45Ni55Nb | 20 | Cr | 10 | Cr20V | 10 | (*1) |
| Test Ex. 23 | 45Ni55Nb | 20 | Cr | 10 | Cr20V | 10 | (*1) |
| Test Ex. 24 | 45Ni55Nb | 20 | Cr | 10 | Cr20V | 10 | (*1) |
| Test Ex. 25 | 45Ni55Nb | 20 | Cr | 10 | Cr20V | 10 | (*1) |
| Test Ex. 26 | 45Ni55Nb | 20 | Cr | 10 | Cr20V | 10 | (*1) |
| Test Ex. 27 | 45Ni55Nb | 20 | Cr | 10 | Cr20V | 10 | (*1) |
| Test Ex. 28 | 50Ni50Ta | 20 | Cr | 10 | Cr6Mo | 10 | (*1) |
| Test Ex. 29 | 50Ni50Ta | 20 | Cr | 10 | Cr6Mo | 10 | (*1) |
| Test Ex. 30 | 48Ni48Ta4Zr | 20 | Cr | 10 | Cr6Mo | 10 | (*1) |
| Test Ex. 31 | 48Ni48Ta4Zr | 20 | Cr | 10 | Cr6Mo | 10 | (*1) |
| Test Ex. 32 | 48Ni48Ta4Zr | 20 | Cr | 10 | Cr6Mo | 10 | (*1) |
| Test Ex. 33 | 48Ni48Ta4Zr | 20 | Cr | 10 | Cr6Mo | 10 | (*1) |
| Test Ex. 34 | 48Ni48Ta4Zr | 20 | Cr | 10 | Cr6Mo | 10 | (*1) |
| Test Ex. 35 | 48Ni48Ta4Zr | 20 | Cr | 10 | Cr6Mo | 10 | (*1) |
| Test Ex. 36 | 48Ni48Ta4Zr | 20 | Cr | 10 | Cr6Mo | 10 | (*1) |

| | Magnetic layer | | | | | | | Magnetostatic characteristics | | | Thermal demagnetization (%/decade) |
|---|---|---|---|---|---|---|---|---|---|---|---|
| | Lower magnetic film | | Intermediate film | | No. of laminated structures (*2) | Uppermost magnetic film | | Coercive force (Oe) | Magnetic anisotropy (-) | Mrt (T·nm) | |
| | Composition | Thickness | Composition | Thickness | | Composition | Thickness | | | | |
| Test Ex. 21 | — | — | — | — | — | Co21Cr9Pt4B | 17 | 3876 | 1.29 | 0.4 | 0.43 |
| Test Ex. 22 | Co14Cr3Ta | 2 | Ru | 0.8 | 1 | Co21Cr9Pt4B | 17 | 3798 | 1.3 | 0.36 | 0.36 |
| Test Ex. 23 | Co14Cr3Ta | 2 | Ru | 0.8 | 2 | Co21Cr9Pt4B | 17 | 3767 | 1.3 | 0.4 | 0.27 |
| Test Ex. 24 | Co14Cr3Ta | 2 | Ru | 0.8 | 3 | Co21Cr9Pt4B | 17 | 3854 | 1.3 | 0.36 | 0.22 |
| Test Ex. 25 | Co14Cr3Ta | 2 | Ru | 0.8 | 4 | Co21Cr9Pt4B | 17 | 3822 | 1.31 | 0.4 | 0.18 |
| Test Ex. 26 | Co14Cr3Ta | 2 | Ru | 0.8 | 5 | Co21Cr9Pt4B | 17 | 3843 | 1.31 | 0.36 | 0.14 |
| Test Ex. 27 | Co14Cr3Ta | 2 | Ru | 0.8 | 6 | Co21Cr9Pt4B | 17 | 3855 | 1.3 | 0.4 | 0.11 |
| Test Ex. 28 | Co14Cr3Ta | 1 | Cr | 1.0 | 2 | Co21Cr9Pt4B | 17 | 3659 | 1.28 | 0.4 | 0.28 |
| Test Ex. 29 | Co14Cr3Ta | 1.5 | Ir | 0.5 | 2 | Co21Cr9Pt4B | 17 | 3678 | 1.29 | 0.4 | 0.27 |
| Test Ex. 30 | Co14Cr3Ta | 1.5 | Rh | 0.8 | 2 | Co21Cr9Pt4B | 17 | 3598 | 1.29 | 0.4 | 0.29 |
| Test Ex. 31 | Co14Cr3Ta | 1 | Mo | 0.6 | 2 | Co21Cr9Pt4B | 17 | 3643 | 1.29 | 0.4 | 0.3 |

TABLE 7-continued

| | | | | | | | | | | |
|---|---|---|---|---|---|---|---|---|---|---|
| Test Ex. 32 | Co14Cr3Ta | 1 | Cu | 0.8 | 2 | Co21Cr9Pt4B | 17 | 3651 | 1.3 | 0.4 | 0.28 |
| Test Ex. 33 | Co14Cr3Ta | 1 | Re | 0.5 | 2 | Co21Cr9Pt4B | 17 | 3675 | 1.3 | 0.4 | 0.28 |
| Test Ex. 34 | Co14Cr3Ta | 1 | V | 1.0 | 2 | Co21Cr9Pt4B | 17 | 3641 | 1.29 | 0.4 | 0.29 |
| Test Ex. 35 | Co14Cr3Ta | 1 | Pd | 0.8 | 2 | Co21Cr9Pt4B | 17 | 3426 | 1.25 | 0.45 | 0.44 |
| Test Ex. 36 | Co14Cr3Ta | 1 | Au | 0.8 | 2 | Co21Cr9Pt4B | 17 | 3411 | 1.25 | 0.45 | 0.44 |

(*1): non-magnetic intermediate layer = composition: Co40Cr, thickness: 2 nm
(*2): number of laminated structures comprising a lower magnetic film and an intermediate film
(units of thickness: nm)

TABLE 8

| | Substrate | Orientation-enhancing layer | | Orientation-adjustment layer | | Second undercoat layer | | Non-magnetic undercoat layer | | Non-magnetic intermediate layer | |
|---|---|---|---|---|---|---|---|---|---|---|---|
| | | Composition | Thickness | Composition | Thickness | Composition | Thickness | Composition | Thickness | Composition | Thickness |
| Test Ex. 37 | Glass | — | — | 85Cr15Ti | 20 | Cr | 10 | Cr20W | 5 | Co37Cr | 2 |
| Test Ex. 38 | Glass | — | — | 85Cr15Ti | 20 | Cr | 10 | Cr20W | 5 | Co37Cr | 2 |
| Test Ex. 39 | Glass | — | — | 80Cr20Mo | 20 | Cr | 10 | Cr20W | 5 | Co37Cr | 2 |
| Test Ex. 40 | Glass | — | — | 80Cr20W | 15 | Cr | 10 | Cr20W | 5 | Co37Cr | 2 |
| Test Ex. 41 | Glass | — | — | 80Cr20W | 15 | Cr | 10 | Cr20W | 5 | Co37Cr | 2 |
| Test Ex. 42 | Glass | — | — | 80Cr20Ru | 15 | Cr | 10 | Cr20W | 5 | Co37Cr | 2 |
| Test Ex. 43 | Glass | — | — | 85Cr15Re | 20 | Cr | 10 | Cr20W | 5 | Co37Cr | 2 |
| Test Ex. 44 | Glass | — | — | V | 20 | Cr | 10 | Cr20W | 5 | Co37Cr | 2 |
| Test Ex. 45 | Glass | — | — | Cr | 20 | Cr | 10 | Cr20W | 5 | Co37Cr | 2 |
| Test Ex. 46 | Glass | 50Ni50Al | 10 | Nb | 25 | Cr | 10 | Cr20W | 5 | Co37Cr | 2 |
| Test Ex. 47 | Glass | 50Fe50Al | 10 | Mo | 20 | Cr | 10 | Cr20W | 5 | Co37Cr | 2 |
| Test Ex. 48 | Glass | — | — | Ta | 20 | Cr | 10 | Cr20W | 5 | Co37Cr | 2 |
| Test Ex. 49 | Glass | — | — | Ta | 20 | Cr | 10 | Cr20W | 5 | Co37Cr | 2 |
| Test Ex. 50 | Glass | 80Co20Zr | 10 | Ta | 20 | Cr | 10 | Cr20W | 5 | Co37Cr | 2 |
| Test Ex. 51 | Glass | 50Ni50Al | 15 | W | 20 | Cr | 10 | Cr20W | 5 | Co37Cr | 2 |
| Test Ex. 52 | Glass | — | — | 66Be34Nb | 20 | Cr | 10 | Cr20W | 5 | Co37Cr | 2 |
| Test Ex. 53 | Glass | — | — | 66V34Ta | 20 | Cr | 10 | Cr20W | 5 | Co37Cr | 2 |
| Test Ex. 54 | Glass | — | — | 50Ta50Zr | 20 | Cr | 10 | Cr20W | 5 | Co37Cr | 2 |
| Test Ex. 55 | Glass | — | — | 50Nb50Ta | 20 | Cr | 10 | Cr20W | 5 | Co37Cr | 2 |
| Test Ex. 56 | Aluminum | 60Co30Cr10Zr | 30 | 65Co35Ta | 20 | Cr | 10 | Cr20W | 5 | Co37Cr | 2 |
| Test Ex. 57 | Aluminum | 56Co26Cr18C | 30 | 70Co30Nb | 20 | Cr | 10 | Cr20W | 5 | Co37Cr | 2 |
| Test Ex. 58 | Glass | — | — | 80Ni20P | 25 | Cr | 10 | Cr20W | 5 | Co37Cr | 2 |

| | Magnetic layer | Oxidation/nitrification | Magnetostatic characteristics | | Thermal demagnetization (%/decade) |
|---|---|---|---|---|---|
| | | | Coercive force (Oe) | Magnetic anisotropy (-) | |
| Test Ex. 37 | (*1) | — | 3654 | 1.23 | 0.24 |
| Test Ex. 38 | (*1) | 20 vol % N2/Ar | 3721 | 1.26 | 0.21 |
| Test Ex. 39 | (*1) | — | 3621 | 1.27 | 0.24 |
| Test Ex. 40 | (*1) | — | 3792 | 1.26 | 0.23 |
| Test Ex. 41 | (*1) | 20 vol % O2/Ar | 3547 | 1.31 | 0.20 |
| Test Ex. 42 | (*1) | — | 3687 | 1.25 | 0.24 |
| Test Ex. 43 | (*1) | — | 3819 | 1.26 | 0.23 |
| Test Ex. 44 | (*1) | — | 3683 | 1.23 | 0.24 |
| Test Ex. 45 | (*1) | — | 3599 | 1.25 | 0.24 |
| Test Ex. 46 | (*1) | — | 3533 | 1.27 | 0.24 |
| Test Ex. 47 | (*1) | — | 3751 | 1.17 | 0.25 |
| Test Ex. 48 | (*1) | — | 3878 | 1.3 | 0.22 |
| Test Ex. 49 | (*1) | N2 gas exposure | 3799 | 1.34 | 0.20 |
| Test Ex. 50 | (*1) | N2 gas exposure | 3925 | 1.37 | 0.18 |
| Test Ex. 51 | (*1) | — | 3616 | 1.21 | 0.25 |
| Test Ex. 52 | (*1) | — | 3968 | 1.35 | 0.20 |
| Test Ex. 53 | (*1) | — | 3598 | 1.31 | 0.23 |
| Test Ex. 54 | (*1) | — | 3469 | 1.28 | 0.25 |
| Test Ex. 55 | (*1) | — | 3983 | 1.36 | 0.20 |
| Test Ex. 56 | (*1) | 20 vol % N2/Ar | 3500 | 1.35 | 0.23 |
| Test Ex. 57 | (*1) | 20 vol % N2/Ar | 3904 | 1.31 | 0.21 |
| Test Ex. 58 | (*1) | O2 gas exposure | 3771 | 1.15 | 0.22 |

(*1): Magnetic layer = third magnetic film (Co18Cr6Pt3Ta, thickness: 2 nm)/first antiferromagnetic film (Ru, thickness: 0.8 nm)/second magnetic film (Co12Cr4Ta, thickness: 2.5 nm)/second antiferromagnetic film (Ru, thickness: 0.8 nm)/first magnetic film (Co22Cr10Pt4B, thickness: 16 nm)

TABLE 9

| | Sub-strate (*1) | Orientation-adjustment layer | | | | Second undercoat layer | | | | Orientation plane |
|---|---|---|---|---|---|---|---|---|---|---|
| | | Composition | Thickness | Inclined incidence | Incident direction | Composition | Thickness | Inclined incidence (*2) | Incident direction | |
| Test Ex. 59 | Aluminum | — | — | — | — | Cr | 10 | No | — | (200) |
| Test Ex. 60 | Aluminum | — | — | — | — | Cr | 10 | No | — | (200) |
| Test Ex. 61 | Aluminum | — | — | — | — | Cr | 10 | No | — | (200) |
| Test Ex. 62 | Aluminum | — | — | — | — | Cr | 10 | No | — | (200) |
| Test Ex. 63 | Aluminum | — | — | — | — | Cr | 10 | No | — | (200) |
| Test Ex. 64 | Aluminum | — | — | — | — | Cr | 10 | No | — | (200) |
| Test Ex. 65 | Aluminum | — | — | — | — | Cr | 10 | No | — | (200) |
| Test Ex. 66 | Aluminum | — | — | — | — | Cr | 10 | Yes | Radial | (200) |
| Test Ex. 67 | Aluminum | Cr35Nb | 20 | Yes | Radial | Cr | 10 | Yes | Radial | (200) |
| Test Ex. 68 | Aluminum | Cr35Nb | 20 | Yes | Radial | Cr | 10 | Yes | Radial | (200) |
| Test Ex. 69 | Aluminum | Cr35Nb | 20 | Yes | Radial | Cr | 10 | Yes | Radial | (200) |
| Test Ex. 70 | Glass | Cr35Nb | 20 | Yes | Radial | Cr | 10 | Yes | Radial | (200) |
| Test Ex. 71 | Glass | Cr35Nb | 20 | Yes | Radial | Cr | 10 | Yes | Radial | (200) |
| Test Ex. 72 | Glass | Cr35Nb | 20 | Yes | Radial | Cr | 10 | No | — | (200) |
| Test Ex. 73 | Aluminum | — | — | — | — | — | — | — | — | — |
| Test Ex. 74 | Aluminum | Ni35Nb | 5 | Yes | Radial | Cr | 10 | Yes | Radial | (200) |
| Test Ex. 75 | Aluminum | — | — | — | — | Cr15Ti | 5 | Yes | Radial | (200) |
| Test Ex. 76 | Aluminum | — | — | — | — | V | 4 | Yes | Radial | (200) |
| Test Ex. 77 | Glass | Co30Ta | 20 | Yes | Radial | Cr | 10 | Yes | Radial | (200) |
| Test Ex. 78 | Glass | Co40Nb | 20 | Yes | Radial | Cr | 10 | Yes | Radial | (200) |
| Test Ex. 79 | Glass | — | — | — | — | Cr35Nb | 10 | Yes | Radial | (200) |
| Test Ex. 80 | Glass | — | — | — | — | Cr35Nb | 10 | Yes | Radial | (200) |

| | Non-magnetic undercoat layer | | | | Non-magnetic intermediate layer | | | |
|---|---|---|---|---|---|---|---|---|
| | Composition | Thickness | Inclined incidence (*2) | Incident direction | Composition | Thickness | Inclined incidence (*2) | Incident direction |
| Test Ex. 59 | Cr15W | 3 | No | — | Co35Cr | 2 | No | — |
| Test Ex. 60 | Cr15W | 3 | No | — | Co35Cr | 2 | No | — |
| Test Ex. 61 | Cr15W | 3 | No | — | Co35Cr | 2 | No | — |
| Test Ex. 62 | Cr15W | 3 | No | — | Co35Cr | 2 | No | — |
| Test Ex. 63 | Cr15W | 3 | No | — | Co35Cr | 2 | No | — |
| Test Ex. 64 | Cr15W | 3 | No | — | Co35Cr | 2 | No | — |
| Test Ex. 65 | Cr15W | 3 | No | — | Co35Cr | 2 | Yes | Circ. |
| Test Ex. 66 | Cr15W | 3 | Yes | Radial | Co35Cr | 2 | Yes | Circ. |
| Test Ex. 67 | Cr15W | 3 | Yes | Radial | Co35Cr | 2 | Yes | Circ. |
| Test Ex. 68 | Cr15W | 3 | Yes | Radial | Co35Cr | 2 | Yes | Circ. |
| Test Ex. 69 | Cr15W | 3 | Yes | Radial | — | — | — | — |
| Test Ex. 70 | Cr15W | 3 | Yes | Radial | — | — | — | — |
| Test Ex. 71 | Cr15W | 3 | No | — | Co35Cr | 2 | No | — |
| Test Ex. 72 | Cr15W | 3 | No | — | Co35Cr | 2 | No | — |
| Test Ex. 73 | Cr15Mo | 5 | No | — | Co20Cr3Ta | 2 | Yes | Circ. |
| Test Ex. 74 | Cr20Ti | 3 | Yes | Radial | Co25Cr2Ta | 2 | Yes | Circ. |
| Test Ex. 75 | Cr20V | 20 | Yes | Radial | Co35Cr | 3 | No | — |
| Test Ex. 76 | Cr20Ti | 10 | Yes | Radial | Co35Cr | 3 | Yes | Circ. |
| Test Ex. 77 | Cr20Mo | 10 | Yes | Radial | Co40Cr | 2 | Yes | Circ. |
| Test Ex. 78 | Cr20V | 10 | Yes | Radial | Co40Cr | 2 | Yes | Circ. |
| Test Ex. 79 | Cr20V | 10 | Yes | Radial | Co35Cr | 2 | No | — |
| Test Ex. 80 | Cr20V | 10 | Yes | Radial | Co40Cr | 2 | Yes | Circ. |

(*1): aluminum = NiP aluminum substrate (NiP plating layer formed on aluminum alloy substrate surface)
glass = crystallized glass
(*2): inclined incidence = incident angle of film formation particles during film formation is 10–75°
(units of thickness: nm)

TABLE 10

| | Magnetic Layer | | | | | | | | |
|---|---|---|---|---|---|---|---|---|---|
| | Third magnetic film | | Second intermediate film | | Second magnetic film | | First intermediate film | | First magnetic film | |
| | Composition | Thickness | Composition | Thickness | Composition | Thickness | Composition | Thickness | Composition | Thickness |
| Test Ex. 59 | — | — | — | — | — | — | — | — | Co21Cr12Pt4B | 18 |
| Test Ex. 60 | — | — | — | — | Co12Cr4Ta | 2.5 | Ru | 0.8 | Co21Cr12Pt4B | 18 |
| Test Ex. 61 | Co12Cr4Ta | 2.5 | Ru | 0.8 | Co12Cr4Ta | 2.5 | Ru | 0.8 | Co21Cr12Pt4B | 18 |
| Test Ex. 62 | Co20Cr10Pt3B | 2 | Ru | 0.8 | Co20Cr10Pt3B | 2 | Ru | 0.8 | Co21Cr12Pt4B | 18 |
| Test Ex. 63 | — | — | — | — | — | — | — | — | Co21Cr12Pt4B | 18 |
| Test Ex. 64 | Co12Cr4Ta | 2.5 | Ru | 0.8 | Co12Cr4Ta | 2.5 | Ru | 0.8 | Co21Cr12Pt4B | 18 |
| Test Ex. 65 | — | — | — | — | — | — | — | — | Co21Cr12Pt4B | 18 |
| Test Ex. 66 | — | — | — | — | — | — | — | — | Co21Cr12Pt4B | 18 |
| Test Ex. 67 | — | — | — | — | — | — | — | — | Co21Cr12Pt4B | 18 |
| Test Ex. 68 | — | — | — | — | Co12Cr4Ta | 2.5 | Ru | 0.8 | Co21Cr12Pt4B | 18 |
| Test Ex. 69 | — | — | — | — | Co15Ru | 2 | Ru | 0.8 | Co21Cr12Pt4B | 18 |
| Test Ex. 70 | — | — | — | — | Co15Ru | 2 | Ru | 0.8 | Co21Cr12Pt4B | 18 |
| Test Ex. 71 | Co18Cr8Pt4B | 2 | Ru | 0.8 | Co18Cr8Pt4B | 2 | Ru | 0.8 | Co21Cr12Pt4B | 18 |
| Test Ex. 72 | Co12Cr4Ta | 2.5 | Ru | 0.8 | Co12Cr4Ta | 2.5 | Ru | 0.8 | Co21Cr12Pt4B | 18 |
| Test Ex. 73 | — | — | — | — | — | — | — | — | Co22Cr12Pt3B | 20 |
| Test Ex. 74 | — | — | — | — | — | — | — | — | Co22Cr12Pt3B | 20 |
| Test Ex. 75 | — | — | — | — | — | — | — | — | Co22Cr12Pt3B | 18 |
| Test Ex. 76 | — | — | — | — | — | — | — | — | Co21Cr13Pt3B2Cu | 20 |
| Test Ex. 77 | — | — | — | — | — | — | — | — | Co23Cr13Pt5B | 20 |
| Test Ex. 78 | — | — | — | — | — | — | — | — | Co23Cr13Pt5B | 20 |
| Test Ex. 79 | — | — | — | — | — | — | — | — | Co21Cr12Pt4B | 18 |
| Test Ex. 80 | — | — | — | — | — | — | — | — | Co21Cr12Pt4B | 18 |

| | Magnetic Layer | | | | | | | |
|---|---|---|---|---|---|---|---|---|
| | Magnetic film | | Intermediate film | | Magnetic film | | | |
| | Inclined incidence | Inclined direction | Inclined incidence | Inclined direction | Orientation plane | S* | OR | SNRm (dB) |
| Test Ex. 59 | Yes | Circ. | Yes | Circ. | (110) | 0.83 | 1.35 | 20.5 |
| Test Ex. 60 | Yes | Circ. | Yes | Circ. | (110) | 0.81 | 1.33 | 21.7 |
| Test Ex. 61 | Yes | Circ. | Yes | Circ. | (110) | 0.83 | 1.32 | 21.3 |
| Test Ex. 62 | Yes | Circ. | Yes | Circ. | (110) | 0.82 | 1.35 | 21.5 |
| Test Ex. 63 | No | — | No | — | (110) | 0.71 | 1.16 | 19.4 |
| Test Ex. 64 | No | — | No | — | (110) | 0.72 | 1.17 | 19.6 |
| Test Ex. 65 | Yes | Circ. | No | — | (110) | 0.84 | 1.35 | 20.8 |
| Test Ex. 66 | Yes | Circ. | Yes | Circ. | (110) | 0.87 | 1.39 | 21.3 |
| Test Ex. 67 | Yes | Circ. | Yes | Circ. | (110) | 0.84 | 1.39 | 20.9 |
| Test Ex. 68 | Yes | Circ. | Yes | Circ. | (110) | 0.85 | 1.40 | 22.0 |
| Test Ex. 69 | Yes | Circ. | Yes | Circ. | (110) | 0.88 | 1.39 | 22.1 |
| Test Ex. 70 | Yes | Circ. | Yes | Circ. | (110) | 0.78 | 1.24 | 19.8 |
| Test Ex. 71 | Yes | Circ. | Yes | Circ. | (110) | 0.77 | 1.27 | 19.7 |
| Test Ex. 72 | Yes | Circ. | Yes | Circ. | (110) | 0.79 | 1.26 | 19.5 |
| Test Ex. 73 | Yes | Circ. | No | — | (110) | 0.87 | 1.38 | 21.6 |
| Test Ex. 74 | Yes | Circ. | Yes | Circ. | (110) | 0.88 | 1.39 | 21.5 |
| Test Ex. 75 | Yes | Circ. | Yes | Circ. | (110) | 0.85 | 1.36 | 21.7 |
| Test Ex. 76 | Yes | Circ. | Yes | Circ. | (110) | 0.88 | 1.35 | 21.4 |
| Test Ex. 77 | Yes | Circ. | Yes | Circ. | (110) | 0.81 | 1.28 | 20.1 |
| Test Ex. 78 | Yes | Circ. | Yes | Circ. | (110) | 0.8 | 1.27 | 20.3 |
| Test Ex. 79 | No | — | No | — | (110) | 0.79 | 1.15 | 19.8 |
| Test Ex. 80 | No | — | No | — | (110) | 0.82 | 1.21 | 20.6 |

*1: inclined incidence = incident angle of film formation particles during film forming is 10–75°
OR: Hcc/Hcr
(units of thickness: nm)

What is claimed is:

1. A magnetic recording disk comprising a non-magnetic substrate, a non-magnetic undercoat layer, a magnetic layer, and a protective layer, the layers being formed on the substrate:

wherein the non-magnetic undercoat layer has a bcc structure;

an orientation-adjustment layer for causing the non-magnetic undercoat layer to have a predominant orientation plane of (200) is formed between the non-magnetic substrate and the non-magnetic undercoat layer;

the magnetic layer has a crystal structure in which columnar crystal grains are inclined in a circumferential direction; and a ratio of a coercive force in a circumferential direction of the magnetic layer Hcc to a coercive force in a radial direction of the magnetic layer Hcr, i.e., Hcc/Hcr, is more than 1.

2. A magnetic recording disk according to claim 1, wherein the magnetic undercoat layer has a crystal structure in which columnar crystal grains are aligned in the radial direction.

3. A magnetic recording disk according to claim 1 or 2, wherein the magnetic layer has a plurality of magnetic films, the magnetic films having an hcp structure and a predominant orientation plane of (110), so that antiferromagnetic bonds are formed between the magnetic films.

4. A magnetic recording disk according to claim 1, wherein the orientation-adjustment layer has a crystal structure in which columnar crystal grains are inclined in a radial direction.

5. A magnetic recording disk according to claim 1, wherein the magnetic layer has a laminated ferrimagnetic structure in which the directions of the magnetic moments of adjacent magnetic films are opposite to each other.

6. A magnetic recording disk according to claim 1, wherein the magnetic layer has a plurality of magnetic films, and a structure in which an intermediate film is interposed between the plurality of magnetic films.

7. A magnetic recording disk according to claim 1, wherein the magnetic layer has two or more laminated structures, each including a magnetic film and an intermediate film adjacent thereto.

8. A magnetic recording disk according to claim 1, wherein among a plurality of magnetic films, a magnetic film adjacent to a primary magnetic film having the largest coercive force has an antiferromagnetic bonding magnetic field which is larger than the coercive force of the magnetic film adjacent to the primary magnetic film.

9. A magnetic recording disk according to claim 6, wherein the intermediate film comprises a material predominantly containing at least one element selected from among Ru, Cr, Ir, Rh, Mo, Cu, Co, Re, and V.

10. A magnetic recording disk according to claim 1, wherein the orientation-adjustment layer comprises one or more elements selected from among Cr, V, Nb, Mo, W, and Ta.

11. A magnetic recording disk according to claim 1, wherein the orientation-adjustment layer comprises an alloy predominantly containing Cr.

12. A magnetic recording disk according to claim 1, wherein the orientation-adjustment layer predominantly comprises a Ta-containing alloy $X_1Ta$ (wherein $X_1$ is one or more elements selected from among Be, Co, Cr, Fe, Nb, Ni, V, Zn, and Zr), and has an Fd3m structure or an amorphous structure.

13. A magnetic recording disk according to claim 1, wherein the orientation-adjustment layer predominantly comprises an Nb-containing alloy $X_2Nb$ (wherein $X_2$ is one or more elements selected from among Be, Co, Cr, Fe, Ni, Ta, V, Zn, and Zr), and has an Fd3m structure or an amorphous structure.

14. A magnetic recording disk according to claim 1, wherein the orientation-adjustment layer predominantly comprises CoTa or CoNb, the Ta content or Nb content being 30–75 at %, and has an Fd3m structure or an amorphous structure.

15. A magnetic recording disk according to claim 1, wherein the orientation-adjustment layer predominantly comprises CrTa or CrNb, the Ta content or Nb content being 15–75 at %.

16. A magnetic recording disk according to claim 1, wherein the orientation-adjustment layer predominantly comprises NiTa or NiNb, the Ta content or Nb content being 30–75 at %, and has an Fd3m structure or an amorphous structure.

17. A magnetic recording disk according to claim 1, wherein the orientation-adjustment layer comprises a non-magnetic metal having an Fd3m structure.

18. A magnetic recording disk according to claim 1, wherein the orientation-adjustment layer comprises a non-magnetic metal having a C15 structure.

19. A magnetic recording disk according to claim 1, wherein an orientation-enhancing layer is formed between the non-magnetic substrate and the orientation-adjustment layer.

20. A magnetic recording disk according to claim 19, wherein, the orientation-enhancing layer comprises a material having a B2 structure or an amorphous structure.

21. A magnetic recording disk according to claim 19, wherein, the orientation-enhancing layer predominantly comprises any one selected from among NiAl, FeAl, CoAl, CoZr, CoCrZr, and CoCrC.

22. A magnetic recording disk according to claim 1, wherein, a plurality of orientation-determining layers are provided.

23. A magnetic recording disk comprising a non-magnetic substrate, a magnetic layer, and a protective layer, the layers being formed on the substrate, characterized in that:

wherein an orientation-adjustment layer for adjusting the crystal orientation of a layer provided directly thereon is formed between the non-magnetic substrate and the magnetic layer, the magnetic layer has a crystal structure in which columnar crystal grains are inclined in a circumferential direction; and a ratio of a coercive force in a circumferential direction of the magnetic layer Hcc to a coercive force in a radial direction of the magnetic layer Hcr, i.e., Hcc/Hcr, is more than 1.

24. A magnetic recording disk according to claim 23, wherein the magnetic layer has a plurality of magnetic films, the magnetic films having an hcp structure and a predominant orientation plane of (110), so that antiferromagnetic bonds are formed between the magnetic films.

25. A magnetic recording disk according to claim 23 or 24, wherein the orientation-adjustment layer has a crystal structure in which columnar crystal grains are inclined in a radial direction.

26. A magnetic recording disk comprising a non-magnetic substrate, a non-magnetic undercoat layer, a magnetic layer, and a protective layer, the layers being formed on the substrate:

wherein an orientation-adjustment layer for adjusting the crystal orientation of a layer provided directly thereon is formed between the non-magnetic substrate and the non-magnetic undercoat layer;

the non-magnetic undercoat layer has a bcc structure;

the magnetic layer has a crystal structure in which columnar crystal grains are inclined in a circumferential direction;

the orientation-adjustment layer is formed from an NiP alloy having an amorphous structure, and can cause the non-magnetic undercoat layer to have a predominant orientation plane of (200); and a ratio of a coercive force in a circumferential direction of the magnetic layer Hcc to a coercive force in a radial direction of the magnetic layer Hcr, i.e., Hcc/Hcr, is more than 1.

27. A magnetic recording disk according to claim 26, wherein the non-magnetic undercoat layer has a crystal structure in which columnar crystal grains are inclined in a radial direction.

28. A magnetic recording disk according to claim 26 or 27, wherein the magnetic layer has a plurality of magnetic films, the magnetic films having an hcp structure and a predominant orientation plane of (110), so that antiferromagnetic bonds are formed between the magnetic films.

29. A magnetic recording disk according to any one of claims 1, 23 or 26, wherein the orientation-adjustment layer comprises nitrogen or oxygen in an amount of at least 1 at %.

30. A magnetic recording and reproducing apparatus comprising a magnetic recording disk, and a magnetic head for recording data onto the magnetic recording disk and reproducing the data therefrom:

wherein the magnetic recording medium has a basic structure of a non-magnetic substrate, a non-magnetic undercoat layer, a magnetic layer, and a protective layer, the layers being formed on the substrate, the non-magnetic undercoat layer having a bcc structure, an orientation-adjustment layer for causing the non-magnetic undercoat layer to have a predominant orientation plane of (200) being formed between the non-magnetic substrate and the non-magnetic undercoat layer, the magnetic layer has a crystal structure in which columnar crystal grains are inclined in a circumferential direction, and a ratio of a coercive force in a circumferential direction of the magnetic layer HCC to a coercive force in a radial direction of the magnetic layer Hcr, i.e., Hcc/Hcr, is more than 1.

31. A magnetic recording and reproducing apparatus according to claim 30, wherein the non-magnetic undercoat layer has a crystal structure in which columnar crystal grains are inclined in a radial direction.

32. A magnetic recording and reproducing apparatus according to claim 30 or 31, wherein the magnetic layer has a plurality of magnetic films, the magnetic films having an hcp structure and a predominant orientation plane of (110), antiferromagnetic bonds are formed between the magnetic films.

33. A magnetic recording and reproducing apparatus according to claim 30 or 31, wherein the orientation-adjustment layer has a crystal structure in which columnar crystal grains are inclined in a radial direction.

* * * * *